(12) United States Patent
Ootani et al.

(10) Patent No.: US 10,884,287 B2
(45) Date of Patent: Jan. 5, 2021

(54) REFLECTIVE TYPE LIQUID CRYSTAL DISPLAY DEVICE AND WEARABLE DEVICE PROVIDED WITH SAME

(71) Applicant: SHARP KABUSHIKI KAISHA, Sakai (JP)

(72) Inventors: Takuya Ootani, Sakai (JP); Kiyoshi Minoura, Sakai (JP); Takashi Satoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 228 days.

(21) Appl. No.: 16/303,640

(22) PCT Filed: May 16, 2017

(86) PCT No.: PCT/JP2017/018408
§ 371 (c)(1),
(2) Date: Nov. 20, 2018

(87) PCT Pub. No.: WO2017/199970
PCT Pub. Date: Nov. 23, 2017

(65) Prior Publication Data
US 2020/0319503 A1    Oct. 8, 2020

(30) Foreign Application Priority Data

May 20, 2016    (JP) .................................. 2016-101066

(51) Int. Cl.
*G02F 1/1335* (2006.01)
*G02F 1/1337* (2006.01)
(Continued)

(52) U.S. Cl.
CPC ...... *G02F 1/133528* (2013.01); *G02F 1/1337* (2013.01); *G02F 1/1362* (2013.01); *G02F 1/13363* (2013.01); *G02F 2202/40* (2013.01)

(58) Field of Classification Search
CPC ................................................. G02F 1/133528
See application file for complete search history.

(56) References Cited

U.S. PATENT DOCUMENTS 6,295,109 B1 * 9/2001 Kubo ................ G02F 1/133371
349/117
2010/0295841 A1    11/2010 Matsuda et al.
(Continued)

FOREIGN PATENT DOCUMENTS

| JP | H11-142836 A | 5/1999 |
| WO | 2009/128280 A1 | 10/2009 |
| WO | 2009/128283 A1 | 10/2009 |

OTHER PUBLICATIONS

Gyoten, "Configuration and characteristics of memory liquid crystal display" in Sharp Technical Journal, vol. 100, Feb. 2010, pp. 23-27 (a concise explanation of the relevance can be found in paragraph [0003] of the specification of the instant application).

*Primary Examiner* — Edmond C Lau
(74) *Attorney, Agent, or Firm* — ScienBiziP, P.C.

(57) ABSTRACT

A reflective liquid crystal display device has a first substrate having a first electrode that reflects light; a second substrate having a second electrode that transmits light; a liquid crystal layer provided between the first electrode and the second electrode, including a nematic liquid crystal material having negative dielectric anisotropy Δε and a chiral agent, having nearly vertical alignment when no voltage is applied, and having twist alignment or hybrid alignment when white voltage is applied; and a polarizing layer provided on the observer side of the second substrate and at least one retarder layer disposed between the polarizing layer and the second substrate, wherein the reflective liquid crystal display device has a drive circuit that applies black voltage or white voltage across the liquid crystal layer at a frame rate of 1 fps or less, and when applying white voltage across the liquid crystal (Continued)

layer over a plurality of frames, the drive circuit applies the white display voltage whose polarity is inverted for each frame with respect to the potential of the second electrode, and assuming that a natural pitch of the nematic liquid crystal material including the chiral agent is p, that a thickness of the liquid crystal layer is d, and that a birefringence of the nematic liquid crystal material is $\Delta n$, $60°<\beta 60°\cdot d/p|<180°$ and $237\ nm \leq \Delta nd \leq 331\ nm$ are established.

12 Claims, 20 Drawing Sheets

(51) Int. Cl.
  *G02F 1/1362* (2006.01)
  *G02F 1/13363* (2006.01)

(56) References Cited

U.S. PATENT DOCUMENTS

| | | |
|---|---|---|
| 2010/0309173 A1 | 12/2010 | Matsuda et al. |
| 2013/0250216 A1* | 9/2013 | Chen ............ G02F 1/134336 349/96 |
| 2018/0373078 A1* | 12/2018 | Mizuno ............ G02F 1/13306 |

* cited by examiner

|  | 360·d/p | | | | | | | | | | | | | | | | | | | |
|---|---|---|---|---|---|---|---|---|---|---|---|---|---|---|---|---|---|---|---|---|
| θ3 | | 0 | 15 | 30 | 45 | 60 | 70 | 75 | 80 | 85 | 90 | 95 | 100 | 105 | 110 | 120 | 135 | 150 | 165 | 180 | 270 |
| | 0 | × | × | × | × | × | × | × | × | × | × | × | × | × | × | × | ○ | ● | ● | ○ | × |
| | 15 | × | × | × | × | × | × | × | × | × | × | × | × | × | × | × | ○ | ● | ● | ○ | × |
| | 30 | × | × | × | × | × | × | × | × | × | × | × | × | × | × | × | ○ | ● | ● | ○ | × |
| | 45 | × | × | × | × | × | × | × | × | × | × | × | × | × | × | × | ○ | ● | ● | ○ | × |
| | 60 | × | × | × | × | × | × | × | × | × | × | × | × | × | × | × | ○ | ● | ● | ○ | × |
| | 75 | × | × | × | × | × | × | × | × | × | × | × | × | × | × | × | ○ | ● | ● | ○ | × |
| | 90 | × | × | × | × | × | × | × | × | × | × | × | × | × | × | × | ○ | ● | ● | ○ | × |
| | 105 | × | × | × | × | × | × | × | × | × | × | × | × | × | × | × | ○ | ● | ● | ○ | × |
| | 120 | × | × | × | × | × | × | × | × | × | × | × | × | × | × | × | ○ | ● | ● | ○ | × |
| | 135 | × | × | × | × | × | × | × | × | × | × | × | × | × | × | × | ○ | ● | ● | ○ | × |
| | 150 | × | × | × | × | × | × | × | × | × | × | × | × | × | × | × | ○ | ● | ● | ○ | × |
| | 165 | × | × | × | × | × | × | × | × | × | × | × | × | × | × | × | ○ | ● | ● | ○ | × |

(b)

|  | 360·d/p | | | | | | | | | | | | | | | | | | | |
|---|---|---|---|---|---|---|---|---|---|---|---|---|---|---|---|---|---|---|---|---|
| θ3 | | 0 | 15 | 30 | 45 | 60 | 70 | 75 | 80 | 85 | 90 | 95 | 100 | 105 | 110 | 120 | 135 | 140 | 150 | 180 | 270 |
| | 0 | × | × | × | × | ○ | ○ | ○ | ○ | ○ | ● | ● | ● | ● | ● | ● | ● | ● | ○ | × | × |
| | 15 | × | × | × | × | × | ○ | ○ | ○ | ○ | ● | ● | ● | ● | ● | ● | ● | ● | ○ | × | × |
| | 30 | × | × | × | × | × | × | × | ○ | ○ | ● | ● | ● | ● | ● | ● | ● | ● | ○ | × | × |
| | 45 | × | × | × | × | × | × | × | × | ○ | ● | ● | ● | ● | ● | ● | ● | ● | ○ | × | × |
| | 60 | × | × | × | × | × | × | × | × | ○ | ○ | ● | ● | ● | ● | ● | ● | ● | ○ | × | × |
| | 75 | × | × | × | × | × | × | × | × | ○ | ○ | ○ | ● | ● | ● | ● | ● | ● | ○ | × | × |
| | 90 | × | × | × | × | × | × | × | × | ○ | ○ | ○ | ● | ● | ● | ● | ● | ● | ○ | × | × |
| | 105 | × | × | × | × | × | × | × | × | ○ | ○ | ○ | ○ | ● | ● | ● | ● | ● | ○ | × | × |
| | 120 | × | × | × | × | × | × | ○ | ○ | ○ | ○ | ○ | ● | ● | ● | ● | ● | ● | ○ | × | × |
| | 135 | × | × | × | × | × | ○ | ○ | ○ | ○ | ○ | ● | ● | ● | ● | ● | ● | ● | ○ | × | × |
| | 150 | × | × | × | × | ○ | ○ | ○ | ○ | ○ | ● | ● | ● | ● | ● | ● | ● | ● | ○ | × | × |
| | 165 | × | × | × | × | ○ | ○ | ○ | ○ | ○ | ● | ● | ● | ● | ● | ● | ● | ● | ○ | × | × |

REFLECTIVE TYPE LIQUID CRYSTAL DISPLAY DEVICE AND WEARABLE DEVICE PROVIDED WITH SAME

TECHNICAL FIELD

The present invention relates to a reflective liquid crystal display device and a wearable device equipped therewith, and more particularly, to a reflective liquid crystal display device with a memory circuit provided for each pixel and a wearable device equipped therewith.

BACKGROUND ART

Mobile devices, such as portable phones, smart phones and tablet terminals, have been used widely, and in recent years, devices referred to as wearable devices, such as eyeglass-type, wrist watch-type and wrist band-type devices, have begun to be put on the market. Of these mobile devices, wearable devices are particularly required to have low power consumption.

A reflective liquid crystal display device does not require a backlight, thereby being excellent in low power consumption property. In Patent Documents 1 and 2 and Non-patent Document 1, the applicant have disclosed reflective liquid crystal display devices (sometimes referred to as "memory liquid crystal device" or "Memory In Pixel (MIP) liquid crystal device") with a memory circuit provided for each pixel. Since the refresh rate (sometimes referred to as frame rate or drive frequency) of the memory liquid crystal device can be lowered, the memory liquid crystal device is excellent in low power consumption property. The reflective liquid crystal display devices described, for example, in the above-mentioned Patent Document 1 is a normally white mode reflective liquid crystal display device having a PDLC layer or a PNLC layer on the reflection electrode. The PDLC layer or the PNLC layer performs white display by scattering incident light in no voltage application state. The contrast ratio of the reflective liquid crystal display device described, for example, in the above-mentioned Patent Document 1 is relatively low, for example, approximately 10:1. All the contents disclosed in Patent Documents 1 and 2 and Non-patent Document 1 are incorporated for reference in this description.

On the other hand, various display modes have been examined to improve the display quality of reflective liquid crystal display devices. For example, Patent Document 3 provided by the applicant has disclosed a reflective liquid crystal display device, the efficiency of utilization for light of which has been improved by using a liquid crystal layer having nearly vertical alignment when no voltage is applied and having twist alignment when voltage is applied. This reflective liquid crystal display device performs display in normal black mode. According to Patent Document 3, a reflective liquid crystal display device having a contrast ratio of 20:1 or more is obtained. The entire disclosure of Patent Document 3 is incorporated by reference in this description.

CITATION LIST

Patent Literature

Patent Document 1: WO 2009/128280 (Japanese Patent No. 5037680)
Patent Document 2: WO 2009/128283 (Japanese Patent No. 5036864)
Patent Document 3: Japanese Laid-Open Patent Publication No. 11-142836 (Japanese Patent No. 3344554)

Non-Patent Literature

Non-patent Document 1: Gyoten, "Configuration and characteristics of memory liquid crystal display" in Sharp Technical Journal, Vol. 100, February, 2010, pages 23-27

SUMMARY OF INVENTION

Technical Problem

When the inventors of the present invention applied the configuration of the memory liquid crystal device to the reflective liquid crystal display device described in Patent Document 3, flicker occurred occasionally.

The present invention has been made to solve this problem and is intended to provide a reflective liquid crystal display device capable of performing display at a contrast ratio of 20:1 or more, capable of suppressing the occurrence of flicker and excellent in low power consumption. In particular, the present invention is intended to provide a reflective liquid crystal display device capable of suppressing the occurrence of flicker in low frequency driving at a drive frequency of 1 Hz (=1 fps, image data is written every second) or less.

Solution to Problem

A reflective liquid crystal display device according to an embodiment of the present invention has a first substrate having a first electrode that reflects light; a second substrate having a second electrode that transmits light; a liquid crystal layer provided between the first electrode and the second electrode, including a nematic liquid crystal material having negative dielectric anisotropy $\Delta\varepsilon$ and a chiral agent, having nearly vertical alignment when no voltage is applied, and having twist alignment or hybrid alignment when white voltage is applied; and a polarizing layer provided on the observer side of the second substrate and at least one retarder layer disposed between the polarizing layer and the second substrate, wherein the reflective liquid crystal display device has a drive circuit that applies black voltage or white voltage across the liquid crystal layer at a frame rate of 1 fps or less, and when applying white voltage across the liquid crystal layer over a plurality of frames, the drive circuit applies the white display voltage whose polarity is inverted for each frame with respect to the potential of the second electrode, and assuming that a natural pitch of the nematic liquid crystal material including the chiral agent is p, that a thickness of the liquid crystal layer is d, and that a birefringence of the nematic liquid crystal material is $\Delta n$, $60° < |\beta 60° \cdot d/p| < 180°$ and $237 \text{ nm} \leq \Delta nd \leq 331 \text{ nm}$ are established.

In a certain embodiment, the thickness of the liquid crystal layer is 2.50 μm or more and 2.75 μm or less.

In a certain embodiment, a dielectric anisotropy $\Delta\varepsilon$ of the nematic liquid crystal material satisfies $-8.0 \leq \Delta\varepsilon \leq -5.8$.

In a certain embodiment, the absolute value of the white voltage is 3.0 V±0.2 V.

In a certain embodiment, the absolute value of the white voltage of positive polarity differs from that of the white voltage of negative polarity.

In a certain embodiment, the reflective liquid crystal display device has a plurality of pixels, each of the plurality of pixels has the first electrode, the second electrode, and a 1-bit SRAM circuit.

In a certain embodiment, at least one of the first substrate and the second substrate has a vertical alignment film for pretilting the liquid crystal molecules of the liquid crystal layer in a predetermined direction when no voltage is applied across the liquid crystal layer.

In a certain embodiment, the first substrate has a first vertical alignment film, and the pretilted direction of the first vertical alignment film has an angle of 0° or more and less than 180° with respect to the transmission axis of the polarizing layer.

In a certain embodiment, the second substrate has a second vertical alignment film and the second vertical alignment film is not subjected to alignment processing. In other words, the reflective liquid crystal display device according to the embodiment is in VAHAN mode. However, the second substrate may have a second vertical alignment film, and the pretilted direction of the liquid crystal molecules may be regulated by the second vertical alignment film. In other words, the reflective liquid crystal display device according to the embodiment may be in VATN mode.

In a certain embodiment, the in-plane retardation of the first retarder layer is 100 nm or more and 180 nm or less, and the in-plane retardation of the second retarder layer is 200 nm or more and 360 nm or less.

In a certain embodiment, assuming that the white voltage of positive polarity is $Vw^+$ and that the white voltage of negative polarity is $Vw^-$, assuming that, when the white voltage of positive polarity is applied, the luminous reflectance is $Y(Vw^+)$ and that the xy chromaticity values are $x(Vw^+)$ and $y(Vw^+)$, and assuming that, when the white voltage of negative polarity is applied, the luminous reflectance is $Y(Vw^-)$ and that the xy chromaticity values are $x(Vw^-)$ and $y(Vw^-)$, and further assuming that $\Delta Y=|\{Y(Vw^+)-Y(Vw^-)\}/(Y(Vw^-))|$, $\Delta x=|x(Vw^+)-x(Vw^-)|$ and $\Delta y=|y(Vw^+)-y(Vw^-)|$, $\Delta Y \leq 2.0\%$, $\Delta x \leq 0.007$ and $\Delta y \leq 0.007$ are satisfied.

A wearable device according to an embodiment of the present invention is equipped with the reflective liquid crystal display device according to any one of the above-mentioned embodiments.

Advantageous Effects of Invention

With the embodiment of the present invention, a reflective liquid crystal display device capable of performing display at a contrast ratio of 20:1 or more, capable of suppressing the occurrence of flicker and excellent in low power consumption is provided.

BRIEF DESCRIPTION OF DRAWINGS

FIG. 14 is a figure showing the ranges of θ3 and 360°·d/p in which the occurrence of flicker (luminance flicker (a) and color flicker (b)) in a sample of the reflective liquid crystal display device is suppressed.

FIG. 15 is a figure showing the ranges of θ3 and 360°·d/p in which the occurrence of flicker (luminance flicker (a) and color flicker (b)) in a sample of the reflective liquid crystal display device is suppressed.

FIG. 16 is a figure showing the ranges of θ3 and 360°·d/p in which the occurrence of flicker (luminance flicker (a) and color flicker (b)) in a sample of the reflective liquid crystal display device is suppressed.

FIG. 17 is a figure showing the ranges of θ3 and 360°·d/p in which the occurrence of flicker (luminance flicker (a) and color flicker (b)) in a sample of the reflective liquid crystal display device is suppressed.

FIG. 18 is a figure showing the ranges of θ3 and 360°·d/p in which the occurrence of flicker (luminance flicker (a) and color flicker (b)) in a sample of the reflective liquid crystal display device is suppressed.

FIG. 19 is a figure showing the ranges of θ3 and 360°·d/p in which the occurrence of flicker (luminance flicker (a) and color flicker (b)) in a sample of the reflective liquid crystal display device is suppressed.

FIG. 20 is a figure showing the ranges of θ3 and 360° ·d/p in which the occurrence of flicker (luminance flicker (a) and color flicker (b)) in a sample of the reflective liquid crystal display device is suppressed.

FIG. 21 is a figure showing the ranges of θ3 and 360° ·d/p in which the occurrence of flicker (luminance flicker (a) and color flicker (b)) in a sample of the reflective liquid crystal display device is suppressed.

FIG. 22 is a figure showing the ranges of θ3 and 360° ·d/p in which the occurrence of flicker (luminance flicker (a) and color flicker (b)) in a sample of the reflective liquid crystal display device is suppressed.

FIG. 23 is a figure showing the ranges of θ3 and 360°·d/p in which the occurrence of flicker (luminance flicker (a) and color flicker (b)) in a sample of the reflective liquid crystal display device is suppressed.

FIG. 24 is a figure showing the ranges of θ3 and 360° ·d/p in which the occurrence of flicker (luminance flicker (a) and color flicker (b)) in a sample of the reflective liquid crystal display device is suppressed.

FIG. 25 is a figure showing the ranges of θ3 and 360° ·d/p in which the occurrence of flicker (luminance flicker (a) and color flicker (b)) in a sample of the reflective liquid crystal display device is suppressed.

DESCRIPTION OF EMBODIMENTS

Figure 1:
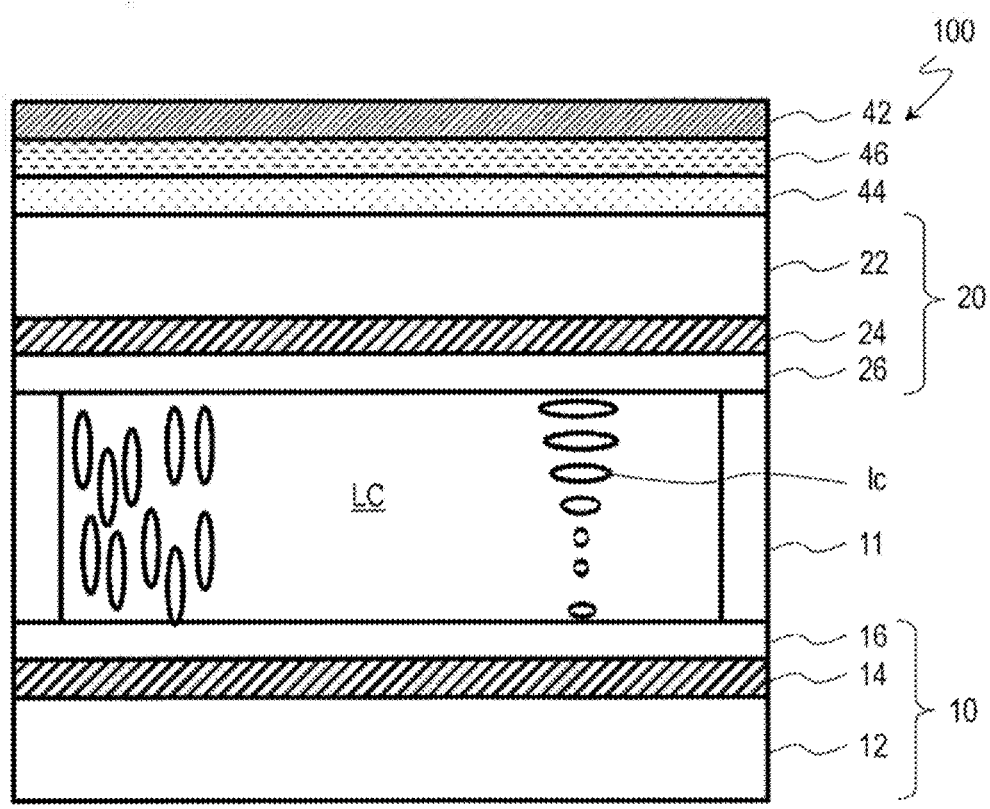
FIG. 1 is a schematic sectional view showing a reflective liquid crystal display device 100 according an embodiment of the present invention.

Although a reflective liquid crystal display device according to an embodiment of the present invention will be described below referring to the drawings, the present invention is not limited to the embodiment described below.

FIG. 1 is a schematic sectional view showing a reflective liquid crystal display device 100 according an embodiment of the present invention. The reflective liquid crystal display device 100 has a first substrate 10 having a first electrode 14 that reflects light, a second substrate 20 having a second electrode 24 that transmits light, and a liquid crystal layer LC provided between the first electrode 14 and the second electrode 24. The first electrode 14 is a reflection pixel electrode and is formed of a metal layer (for example, an Al layer) or a layered structure of a metal layer and a transparent conductive layer. The second electrode 24 is a common electrode and is formed of a transparent conductive layer (for example, an ITO layer). The reflective liquid crystal display device 100 further has a polarizing layer 42 provided on the observer side of the second substrate 20 and two retarder layers 44 and 46 disposed between the polarizing layer 42 and the second substrate 20. Although an example having the two retarder layers 44 and 46 is herein shown, one retarder layer equivalent to the two retarder layers 44 and 46 can also be used. The polarizing layer 42 is a linear polarizing layer and transmits linearly polarized light that is parallel to the transmission axis thereof (also referred to as the polarization axis). The liquid crystal layer LC is hermetically held between the first substrate 10 and the second substrate 20 by a sealing portion 11. The first substrate 10 and the second substrate 20 are insulating substrates, and glass substrates or plastic substrates, for example, are used. At least, the second substrate 20 is transparent. The first substrate 10 and the second substrate 20 may be flexible substrates.

The liquid crystal layer LC of the reflective liquid crystal display device 100 has a chiral nematic liquid crystal material having negative dielectric anisotropy LE. The chiral nematic liquid crystal material includes the nematic liquid crystal material having negative dielectric anisotropy Δε and a chiral agent. The liquid crystal layer LC has nearly vertical alignment when no voltage is applied (see the left side of the liquid crystal layer LC in FIG. 1) and has twist alignment or hybrid alignment when white voltage is applied (see the right side of the liquid crystal layer LC in FIG. 1). The left side of the liquid crystal layer LC in FIG. 1 schematically shows the state in which the liquid crystal molecules 1c are nearly vertically aligned when no voltage is applied across the liquid crystal layer LC (or voltage lower than the threshold voltage is applied), and the right side of the liquid crystal layer LC schematically shows the state in which the liquid crystal molecules 1c are twist-aligned when white voltage is applied across the liquid crystal layer LC. As shown in FIG. 1, by the alignment regulation forces of vertical alignment films 16 and 26, the liquid crystal layer LC typically has a pretilt angle of, for example, approximately 87° with respect to the plane parallel to the liquid crystal layer LC in the state in which no voltage is applied. The direction (alignment direction) in which the liquid crystal molecules 1c are pretilted is regulated to a predetermined direction by, for example, rubbing processing or optical alignment processing. The predetermined direction can have an angle of 0° or more and less than 180° with respect to the transmission axis of the polarizing layer 42.

The twist-aligned liquid crystal layer LC is obtained by subjecting both the vertical alignment films 16 and 26 to the alignment processing, and the hybrid-aligned liquid crystal layer LC is obtained by subjecting only either one of them to the alignment processing. The above liquid crystal layers are used to form reflective liquid crystal display devices for performing display in VATN mode and VAHAN mode, respectively. In the case that the reflective liquid crystal display device for the VAHAN mode is manufactured, the substrate to be subjected to the alignment processing may be either one; however, in the case that rubbing processing is performed, the step on the surface of the alignment film is preferably smaller.

The polarizing layer 42 and the retarder layers 44 and 46 designate optical layers having functions respectively corresponding thereto. In addition to these optical layers, a protection layer (for example, a TAC layer) and/or an adhesive layer (including a sticking layer) are disposed between these optical layers, although the additional layers are not shown. The protection layer and/or the adhesive layer are herein ignored to simplify the explanation. In the case that the protection layer and/or the adhesive layer have retardation, the whole of these layers and the retarder layers may merely be made to become equivalent to the two retarder layers 44 and 46.

Typically, the retarder layer 44 is a so-called λ/4 plate, and the retarder layer 46 a so-called λ/2 plate. X is the wavelength of visible light, and the range of the main wavelength of visible light is 400 nm or more and 720 nm or less. Hence, the in-plane retardation (hereafter simply referred to as retardation) of the retarder layer 44 may be 100 nm or more and 180 nm or less, and the retardation of the retarder layer 46 may be 200 nm or more and 360 nm or less. The polarizing layer 42 and the retarder layers 44 and 46 are disposed so that circularly polarized light is made incident on the liquid crystal layer LC. In the case that the retarder layer 44 has reverse wavelength dispersion, the retarder layer 46 may be omitted.

Figure 2:
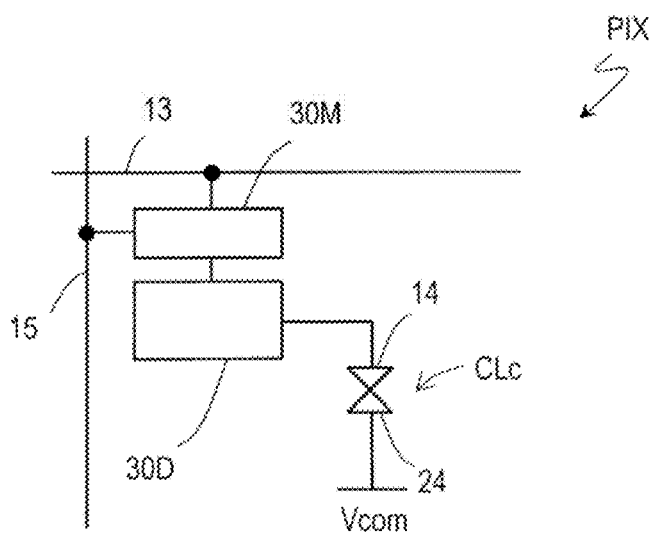
FIG. 2 is a diagram of an equivalent circuit of the portion corresponding to a pixel of the reflective liquid crystal display device 100.

The first substrate 10 is, for example, an active matrix substrate and has a gate bus line 13, a data bus line 15, a memory circuit 30M, and a display voltage supply circuit 30D as schematically shown in FIG. 2. The memory circuit 30M is, for example, a 1-bit SRAM circuit and is provided for each pixel. The specific configurations and operations of the memory circuit 30M and other devices will be described later. In other words, the reflective liquid crystal display device 100 is a form of the above-mentioned memory liquid crystal device.

The reflective liquid crystal display device 100 has a drive circuit (not shown) that applies black voltage or white voltage across the liquid crystal layer LC at a frame rate of 1 fps or less. When applying white voltage across the liquid crystal layer LC over a plurality of frames, this drive circuit applies the white display voltage whose polarity is inverted for each frame with respect to the potential (referred to as Vcom) of the second electrode 24. In other words, the reflective liquid crystal display device 100 is driven by so-called frame inversion driving. In the reflective liquid crystal display device 100, each pixel performs two-level (black and white) display. However, color display can be performed by providing color filters and using an area gradation method. Although the reflective liquid crystal display device described, for example, in Patent Document 1 has a PDLC layer as a liquid crystal layer and performs white display by scattering incident light in no voltage application state, the reflective liquid crystal display device 100 displays black when no voltage is applied (including the time when a voltage lower than the threshold voltage is applied).

Assuming that the natural pitch of the nematic liquid crystal material including the chiral agent is p, that the thickness of the liquid crystal layer LC is d, and that the birefringence of the nematic liquid crystal material is Δn (=$n_e$–$n_o$), the reflective liquid crystal display device 100 is configured so that 60°<|360° ·d/p|<180° and 237 nm≤Δn·d≤331 nm are established. A reflective liquid crystal display device capable of performing display at a contrast ratio of 20:1 or more, capable of suppressing the occurrence of flicker and excellent in low power consumption is obtained by using the above-mentioned liquid crystal layer LC as will be explained by giving experimental examples and simulation examples. In the case that the conditions of 0<|d/p|<1 and 200 nm Δn·d≤1200 nm described in Patent Document 3 are merely satisfied, flicker may occur occasionally when the above-mentioned drive peculiar to the memory liquid crystal device is applied.

Figure 3:
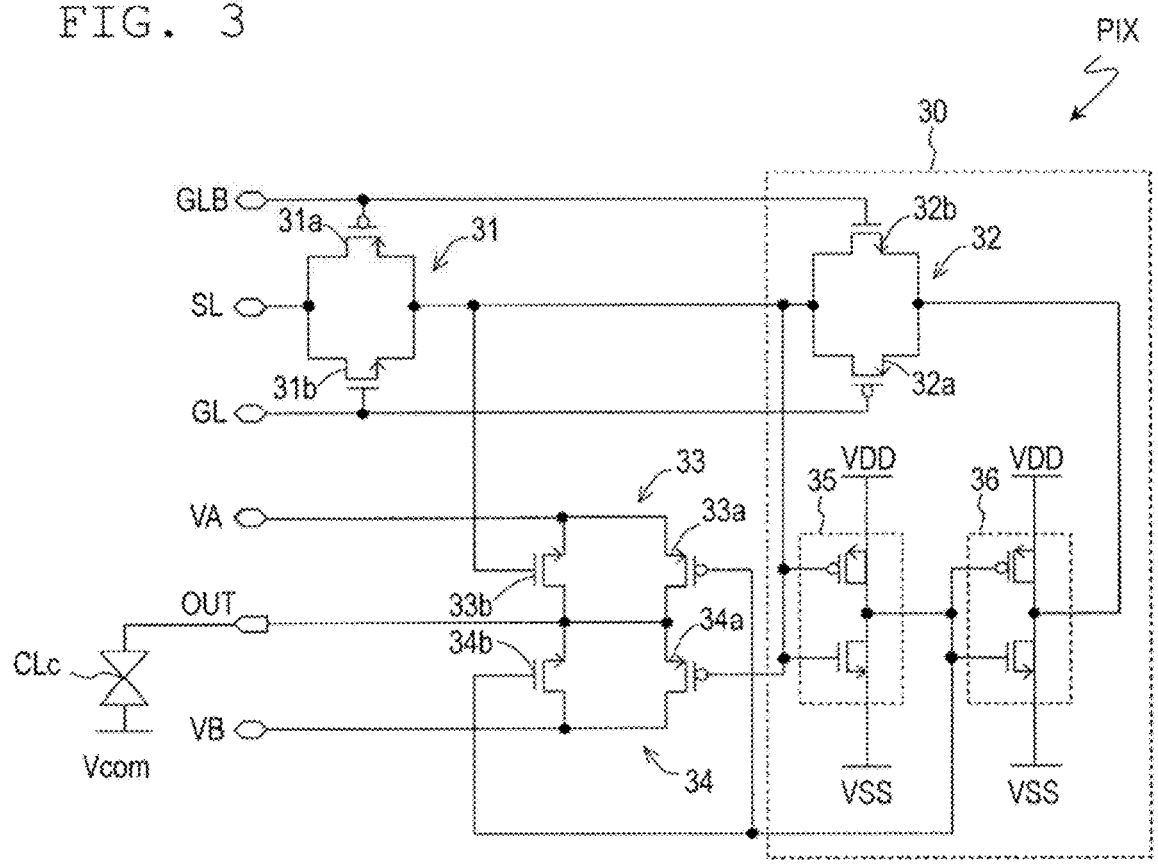
FIG. 3 is a circuit diagram showing an example of the circuit configuration of the portion corresponding to a pixel of the reflective liquid crystal display device 100.

FIG. 3 is a circuit diagram showing an example of the circuit configuration of the portion corresponding to a pixel of the reflective liquid crystal display device 100. Since the details of the configuration of the reflective liquid crystal display device 100 serving as the memory liquid crystal device have been described in Patent Documents 1 and 2, the circuit configuration of the portion corresponding to the pixel will herein be described briefly.

The pixel PIX is equipped with a liquid crystal capacitor CLc, a pixel memory 30, an analog switch 31, and analog switches 33 and 34. Furthermore, the pixel memory 30 is equipped with an analog switch 32 and inverters 35 and 36.

The liquid crystal capacitor CLc is formed of the liquid crystal layer LC (see FIG. 1) provided between the first electrode 14 and the second electrode 24 and is configured so that a polarity output OUT is supplied to the first electrode 14 and a common output Vcom is supplied to the second electrode 24. The analog switches 31 to 34 and the inverters 35 and 36 are each formed of a CMOS circuit.

The analog switch 31 is inserted between a source line output SL and the pixel memory 30, the gate of the PMOS transistor 31*a* thereof is connected to a gate line inverting output GLB, and the gate of the NMOS transistor 31*b* thereof is connected to a gate line output GL. In the pixel memory 30, the analog switch 32 is inserted between the input of the inverter 35 and the output of the inverter 36, the gate of the PMOS transistor 32*a* thereof is connected to the gate line output GL, and the gate of the NMOS transistor 32*b* thereof is connected to the gate line inverting output GLB. The input of the inverter 35 is connected to the connection terminal of the analog switch 31 on the opposite side of the source line output SL. The output of the inverter 35 is connected to the input of the inverter 36. The inverters 35 and 36 use a power source VDD as a HIGH-side power source and use a power source VSS as a LOW-side power source.

The analog switch 33 is inserted between a white polarity output VA and the polarity output OUT, the gate of the PHOS transistor 33*a* thereof is connected to the output of the inverter 35, and the gate of the NMOS transistor 33*b* thereof is connected to the input of the inverter 35. The analog switch 34 is inserted between a black polarity output VB and the polarity output OUT, the gate of the PMOS transistor 34*a* thereof is connected to the input of the inverter 35, and the gate of the NMOS transistor 34*b* thereof is connected to the output of the inverter 35.

Figure 4:
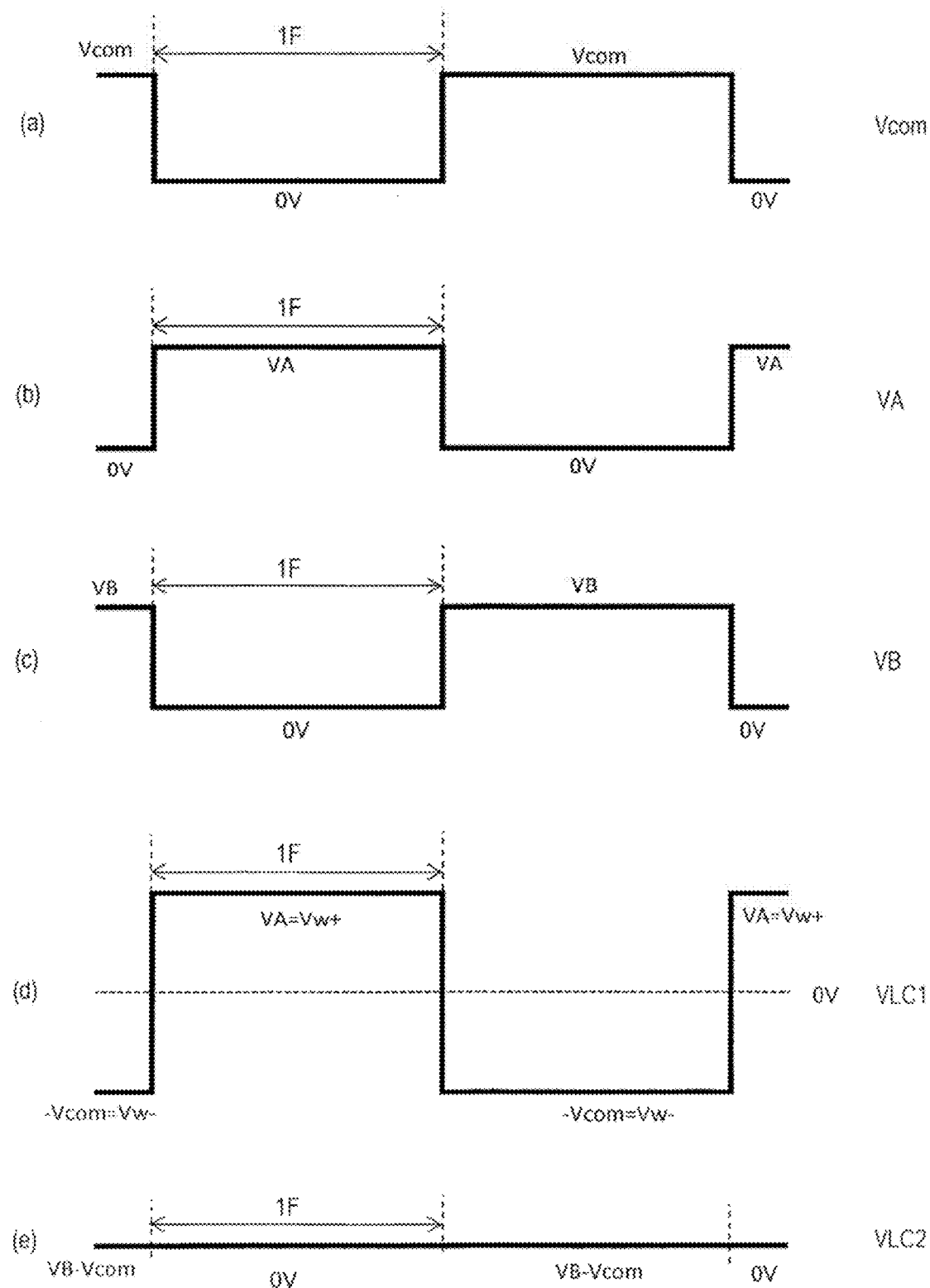
FIG. 4 are schematic waveform diagrams showing the waveforms of the signal voltages for driving the reflective liquid crystal display device 100 and the voltages applied across the liquid crystal layer.

FIGS. 4 (*a*) to 4 (*e*) are schematic waveform diagrams showing the waveforms of the signal voltages for driving the reflective liquid crystal display device 100 and the voltages applied across the liquid crystal layer. FIG. 4(*a*) shows the waveform of the common output Vcom, FIG. 4 (*b*) shows the waveform of the white polarity output VA, and FIG. 4 (*c*) shows the waveform the black polarity output VB. These voltages can be supplied from known drivers. The common output Vcom is a voltage oscillating between 0 V and Vcom (positive polarity) (the cycle of the oscillation is two frames (2F)).

FIG. 4(*d*) shows the white voltage VLC1 applied across the liquid crystal layer, and FIG. 4 (*e*) shows the black voltage VLC2 applied across the liquid crystal layer. The white voltage VLC1 is VA–Vcom, and the black voltage VLC2 is VB–Vcom. Assuming that the white voltage of positive polarity is $Vw^+$ and that the white voltage of negative polarity is $Vw^-$, |$Vw^+$| does not coincide with |$Vw^-$| as described later; for example, when the polarity is inverted for each frame (1F), flicker occurs. Since the general liquid crystal display device described, for example, in Patent Document 3 is driven at 60 Hz (60 fps), flicker is hardly visually recognized, and an averaging measure in space and/or time can be taken; however, in the case that the display device is driven at a low frequency of 1 fps or less, flicker is liable to be visually recognized. Furthermore, a display device for a wearable device is required to be low in power consumption and driven at low voltage. In the following description, a display device that is driven using a battery (for example, a 3 V button battery) is assumed to be used, and the configuration of the reflective liquid crystal display device 100 that is configured so that the highest performance is obtained when a voltage of 3V in absolute value is supplied as the white voltage VLC1 will be described. The frame rate for driving is 1 fps, and frame inversion driving is performed.

Figure 5:
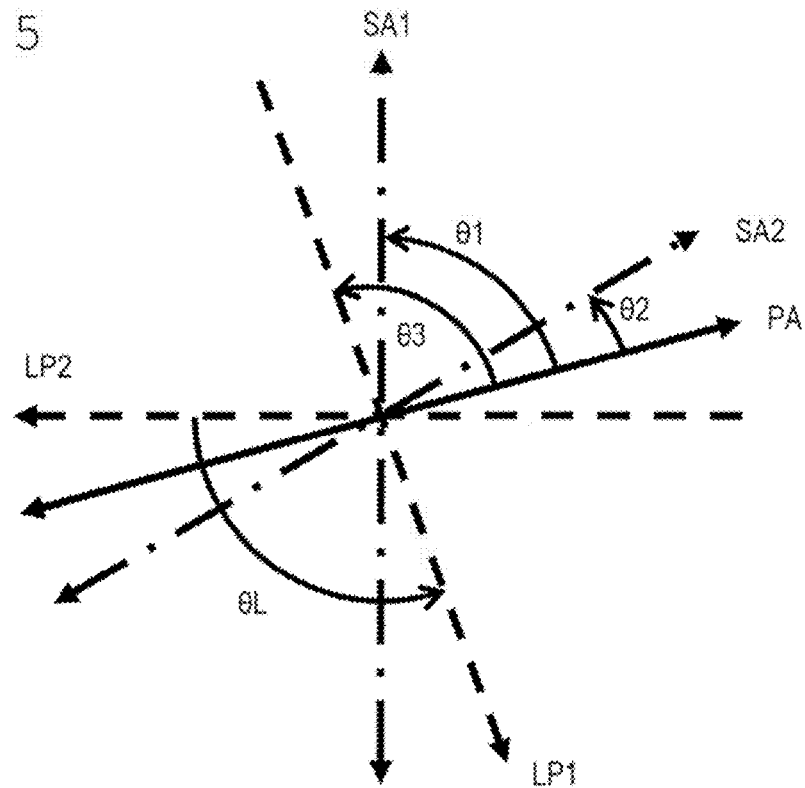
FIG. 5 is a view schematically showing the relationship among the polarization axis PA of the polarizing plate of the reflective liquid crystal display device 100, the slow axis SA1 of the first retarder layer, the slow axis SA2 of the second retarder layer, the pretilted direction LP1 of the liquid crystal molecules on the first vertical alignment film, and the pretilted direction LP2 of the liquid crystal molecules on the second vertical alignment film.

FIG. 5 schematically shows the relationship among the polarization axis (=transmission axis) PA of the polarizing plate of the reflective liquid crystal display device 100, the slow axis SA1 of the first retarder layer 44, the slow axis SA2 of the second retarder layer 46, the pretilted direction LP1 of the liquid crystal molecules on the first vertical alignment film 16, and the pretilted direction LP2 of the liquid crystal molecules on the second vertical alignment film 26. When the reflective liquid crystal display device 100 is viewed from the side of the observer, the angles of the slow axis SA1 of the first retarder layer 44, the slow axis SA2 of the second retarder layer 46 and the pretilted direction LP1 of the liquid crystal molecules on the first vertical alignment film 16 are assumed to be θ1, θ2 and θ3, respectively, with the counterclockwise direction as positive with respect to the polarization axis PA. Moreover, the twist alignment of the liquid crystal layer is twisted counterclockwise from the pretilted direction LP2 of the liquid crystal molecules on the second vertical alignment film 26 toward the pretilted direction LP1 of the liquid crystal molecules on the first vertical alignment film 16, and twisted angle is represented by DL. In the following description, the case in which only the pretilted direction LP1 of the liquid crystal molecules on the first vertical alignment film 16 is regulated and the pretilted direction LP2 of the second vertical alignment film 26 is not regulated (alignment processing is not performed) is taken as an example. At this time, the twisted angle DL can be assumed to be nearly equal to 360° ·d/p.

The clockwise rotation by this angle 360° ·d/p from the pretilted direction LP1 of the liquid crystal molecules on the first vertical alignment film 16 toward the second vertical alignment film 26 viewed from the side of the observer is assumed to be positive, and the counterclockwise rotation is assumed to be negative. Also in the case that the pretilted direction LP2 of the second vertical alignment film 26 is also regulated (that is, in the VAIN mode), the results described below are appropriate.

Figure 6:
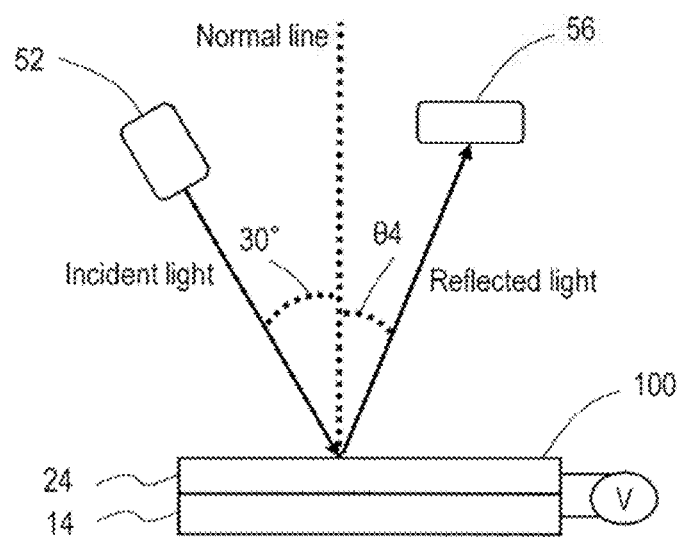
FIG. 6 is a view schematically showing a configuration for measuring the voltage-reflectivity property of the reflective liquid crystal display device 100.
Figure 7:
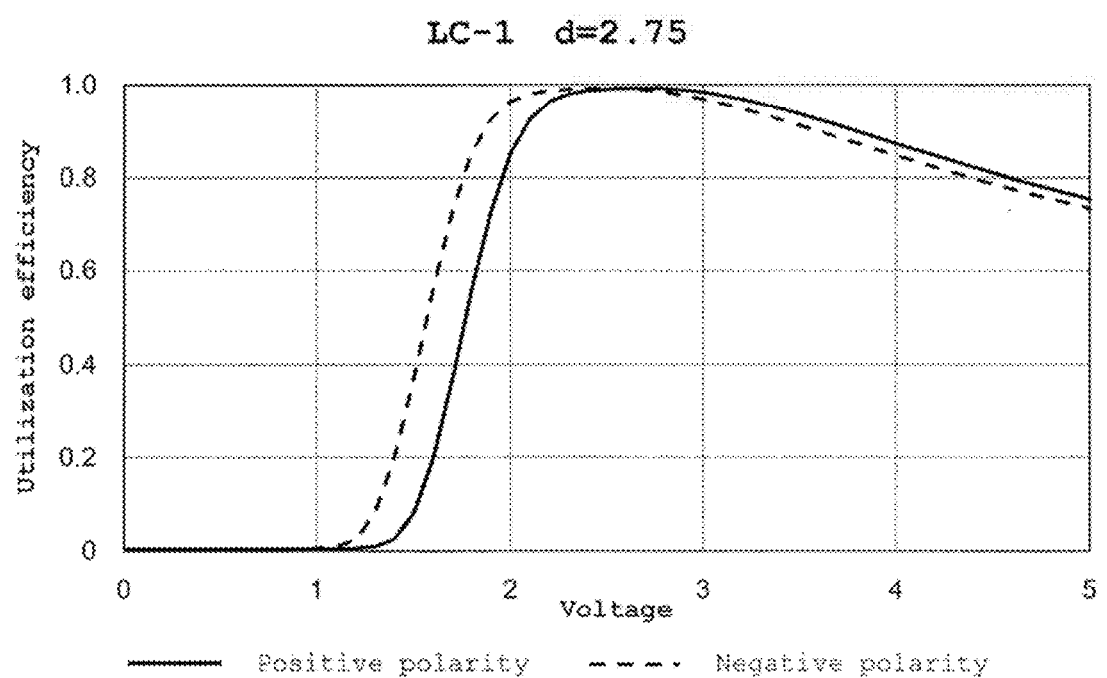
FIG. 7 is a graph showing the voltage-utilization efficiency property of a sample of the reflective liquid crystal display device.
Figure 8:
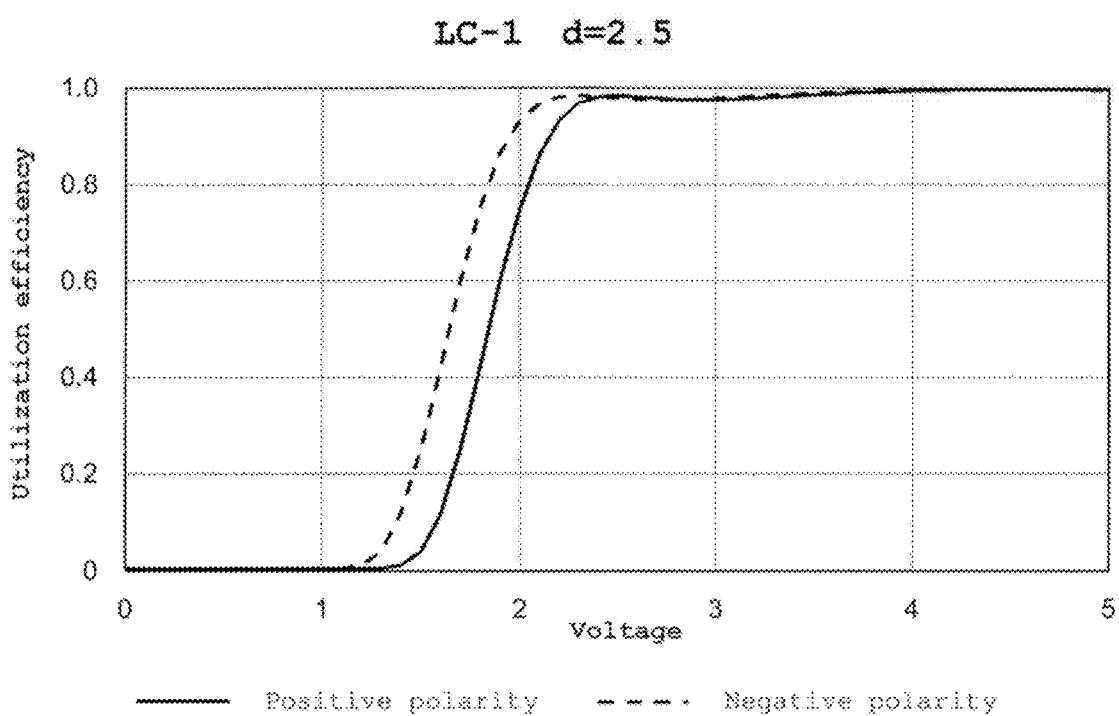
FIG. 8 is a graph showing the voltage-utilization efficiency property of another sample of the reflective liquid crystal display device.
Figure 9:
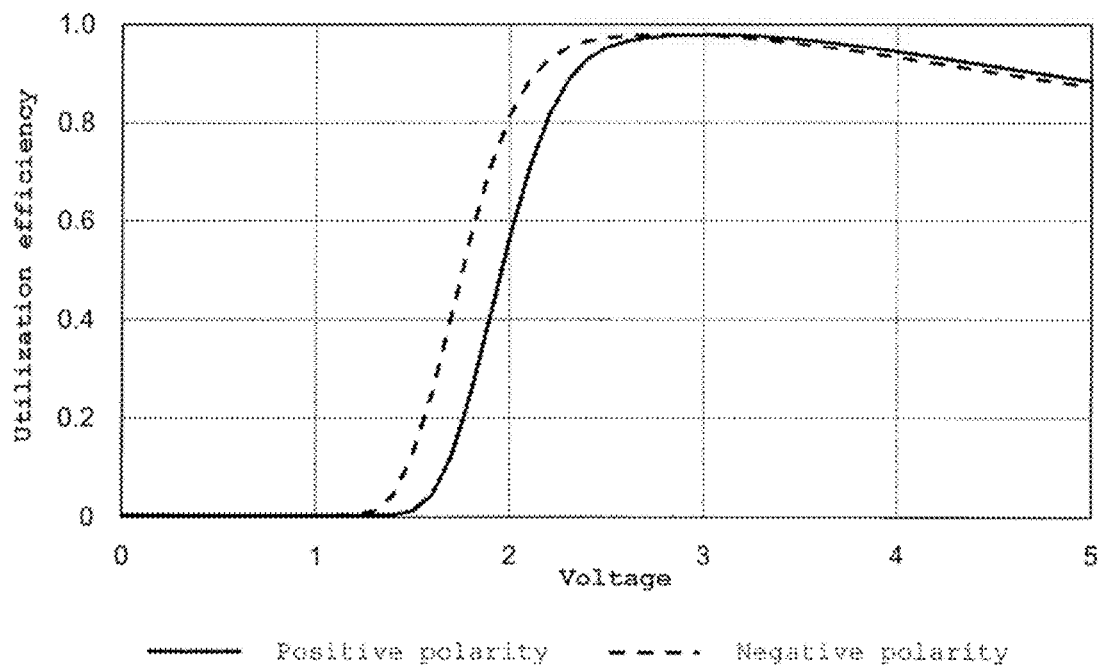
FIG. 9 is a graph showing the voltage-utilization efficiency property of still another sample of the reflective liquid crystal display device.
Figure 10:
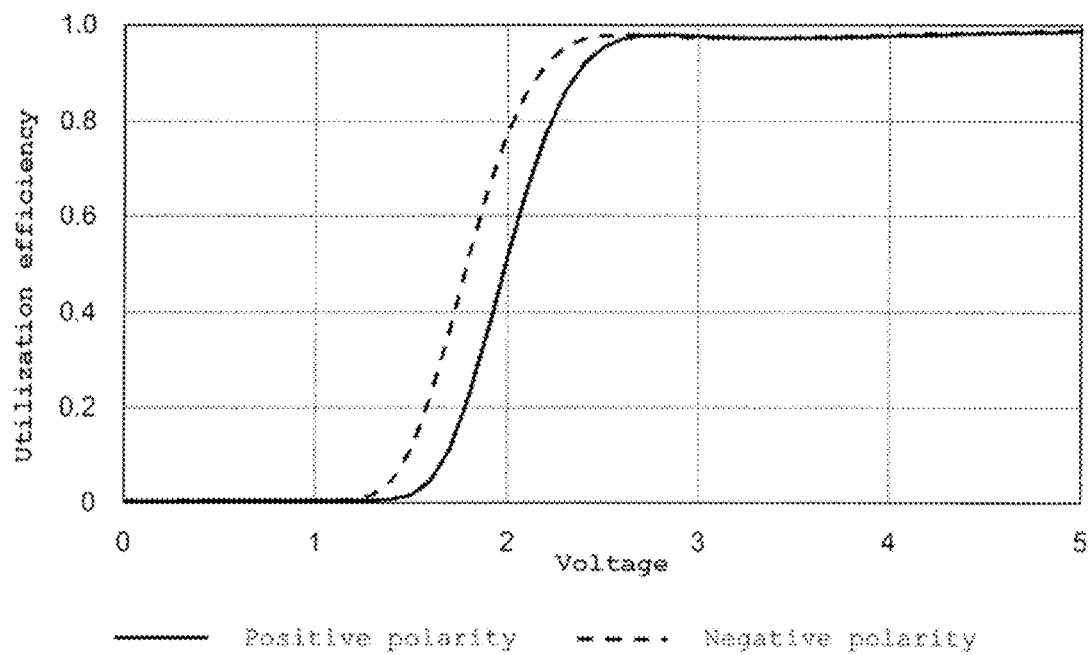
FIG. 10 is a graph showing the voltage-utilization efficiency property of still another sample of the reflective liquid crystal display device.
Figure 11:
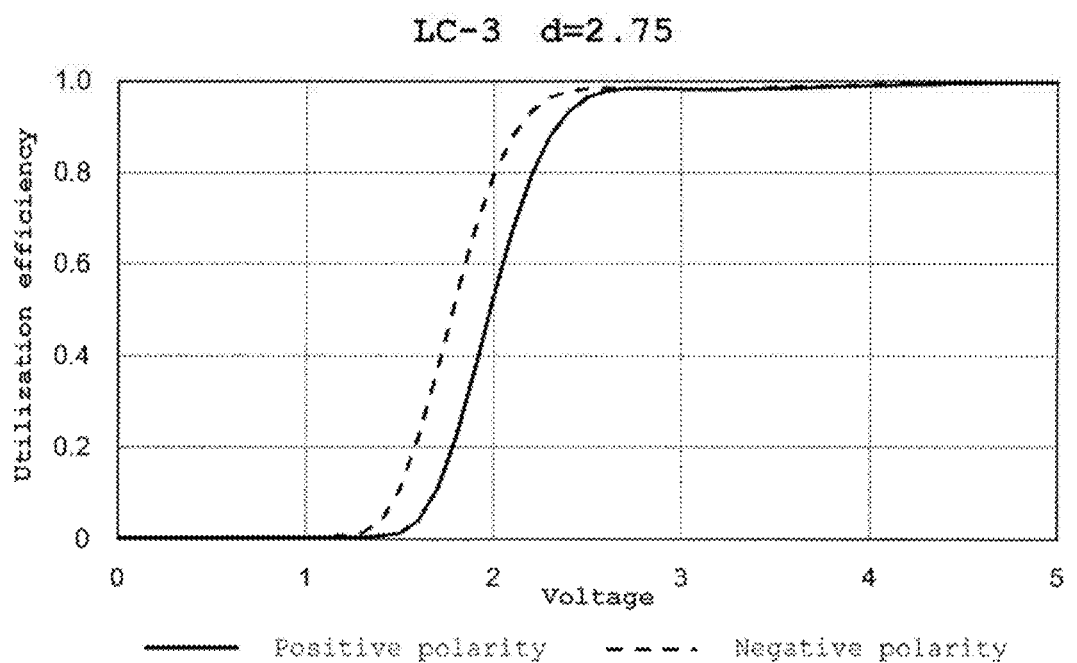
FIG. 11 is a graph showing the voltage-utilization efficiency property of still another sample of the reflective liquid crystal display device.
Figure 12:
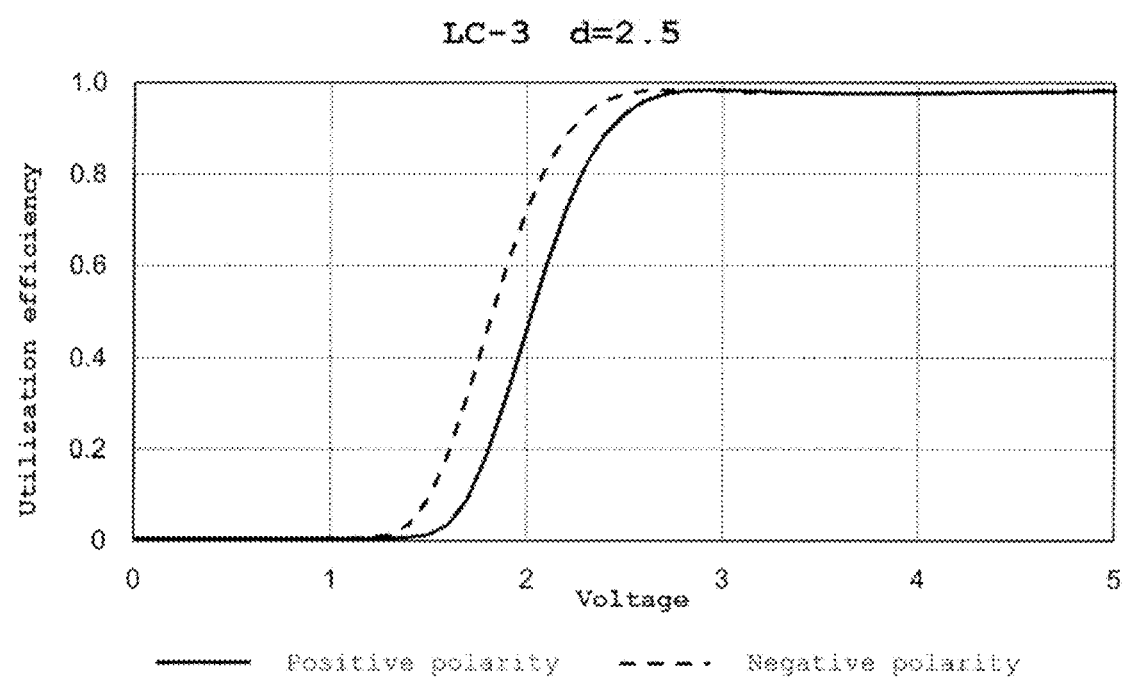
FIG. 12 is a graph showing the voltage-utilization efficiency property of still another sample of the reflective liquid crystal display device.
Figure 13:
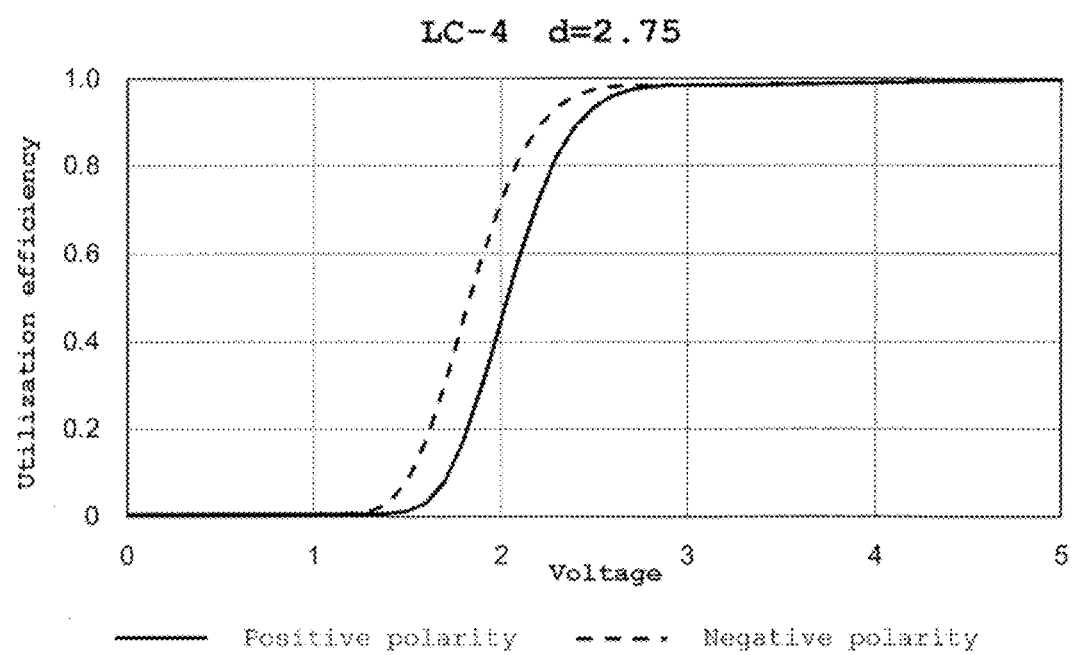
FIG. 13 is a graph showing the voltage-utilization efficiency property of still another sample of the reflective liquid crystal display device.

FIG. 6 schematically shows a configuration for measuring the voltage-reflectivity property of the reflective liquid crystal display device 100. While voltage was applied to the reflective liquid crystal display device 100, the light from an illumination light source device 52 was made incident on the reflective liquid crystal display device 100 in the direction of 30° from the normal line, and the reflected light from the reflection pixel electrode 14 was detected by an optical detector 56. θ4 was changed in the range of 0° to 40°. From the detected reflected light, Y, x and y of Vw$^+$ and Vw$^-$ were obtained. The high-speed spectrograph of the Display Measurement System DMS-803 made by KONICA MINOLTA was used as the optical detector 56.

Samples (experimental examples 1 to 7) having structures equivalent to that of the reflective liquid crystal display device 100 were manufactured. Nematic liquid crystal materials LC-1 to LC-4 (Table 1) each having negative dielectric anisotropy Δε were used as liquid crystal materials, and the value of 360° ·d/p was adjusted by adjusting the type and the addition amount of chiral dopant. The vertical alignment films available commercially were used as the alignment films. The retardation of the first retarder layer 44 was set to 140 nm, the retardation of the second retarder layer 46 was set to 270 nm, θ1 was set to 75°, and θ2 was set to 15°. A polarizing plate having a reflectivity of 38.2% when the polarizing plate was measured alone was used as the polarizing layer 42. Table 2 shows the configurations of the samples of experimental examples 1 to 7, and FIGS. 7 to 13 show voltage-utilization efficiency curves.

TABLE 1

|  | εΔ | Δn |
| --- | --- | --- |
| LC-1 | −8.0 | 0.1205 |
| LC-2 | −7.1 | 0.1096 |
| LC-3 | −6.8 | 0.1053 |
| LC-4 | −6.5 | 0.0992 |
| LC-5 | −6.2 | 0.0949 |
| LC-6 | −5.8 | 0.0980 |

TABLE 2

|  | Example 1 | Example 2 | Example 3 | Example 4 | Example 5 | Example 6 | Example 7 |
| --- | --- | --- | --- | --- | --- | --- | --- |
| Liquid crystal | LC-1 | LC-1 | LC-2 | LC-2 | LC-3 | LC-3 | LC-4 |
| Δn | 0.1205 | 0.1205 | 0.1096 | 0.1096 | 0.1053 | 0.1053 | 0.0992 |
| Δnd (nm) | 331 | 301 | 301 | 274 | 290 | 263 | 273 |
| 360 · d/p (°) | 120 | 90 | 110 | 85 | 90 | 80 | 90 |
| d (μm) | 2.75 | 2.50 | 2.75 | 2.50 | 2.75 | 2.50 | 2.75 |
| p (μm) | 8.25 | 10.00 | 9.00 | 10.59 | 11.00 | 11.25 | 11.00 |
| θ3 (°) | 60 | 30 | 15 | 75 | 45 | 60 | 60 |

First, reference is made to FIGS. 7 to 13. FIGS. 7 to 13 show the voltage-utilization efficiency curves of the samples of experimental examples 1 to 7 shown in Table 2, respectively. The utilization efficiency on the vertical axis is a value obtained by standardizing the reflectivity of each sample using the reflectivity (38.2%) of the polarizing plate. The direction of measurement is the normal line direction (θ4=0°). Each figure shows a curve (solid line) obtained by applying voltage of positive polarity and a curve (broken line) obtained by applying voltage of negative polarity. The horizontal axis represents the absolute value (V) of the voltage. Each curve is obtained by forming the result of the measurement of the reflectivity into a graph at each 0.1 V.

As clearly shown in FIGS. 7 to 13, there is a difference between the curve obtained by applying the voltage of positive polarity and the curve obtained by applying the voltage of negative polarity. This difference is approximately 0.2 V. It is thus understood that the difference (|Vw$^-$|−|Vw$^+$|) between the white voltage Vw$^-$ of negative polarity and the white voltage Vw$^+$ of positive polarity is approximately 0.2 V. This difference (voltage shift) in the voltage-utilization efficiency curve depending on the polarity causes flicker. However, the cause of the difference depending on the polarity of the voltage is currently not known sufficiently.

Next, in order that conditions that flicker is visually recognized are evaluated quantitatively, samples (experimental examples 8 to 12) were manufactured similarly to the above-mentioned experimental examples 1 to 7. Table 3 shows the configurations of the samples of experimental examples 8 to 12. These examples are the same as the above-mentioned experimental examples except for the configurations described in Table 3.

TABLE 3

|  | Example 8 | Example 9 | Example 10 | Example 11 | Example 12 |
| --- | --- | --- | --- | --- | --- |
| Liquid crystal | LC-6 | LC-6 | LC-6 | LC-6 | LC-6 |
| Δn | 0.0980 | 0.0980 | 0.0980 | 0.0980 | 0.0980 |
| Δnd (nm) | 294 | 294 | 294 | 245 | 245 |
| 360 · d/p (°) | 50 | 70 | 90 | 50 | 70 |
| d (μm) | 3.00 | 3.00 | 3.00 | 2.50 | 2.50 |
| p (μm) | 21.60 | 15.42 | 12.00 | 18.00 | 12.86 |
| θ3 (°) | 35 | 35 | 35 | 35 | 35 |

Tables 4 to 8 show the values of ΔY, Δx and Δy with respect to the applied voltages (absolute values) of the respective samples and the results of the evaluation as to whether flicker is visually recognized or not. In the table, x indicates that flicker has been visually recognized, and ○ indicates that flicker has not been visually recognized.

Assuming that the luminous reflectance is Y(Vw$^+$) and that the xy chromaticity values are x(Vw$^+$) and y(Vw$^+$) obtained by measuring the reflected light from the sample at the time when the white voltage of positive polarity is applied, and assuming that the luminous reflectance is Y(Vw$^-$) and that the xy chromaticity values are x(Vw$^-$) and y(Vw⁻) at the time when the white voltage of negative polarity is applied, ΔY, Δx and Δy were obtained from the following formulas:

$$\Delta Y=|\{Y(Vw^+)-Y(Vw^-)\}/(Y(Vw^-))|$$

$$\Delta x=|x(Vw^+)-x(Vw^-)|$$

$$\Delta y=|y(Vw^+)-y(Vw^-)|$$

The presence/absence of flicker was evaluated visually and by observing microscopic images.

TABLE 4

| Applied voltage (V) | ΔY | Δx | Δy | Flicker |
|---|---|---|---|---|
| 4.0 | 3.59% | 0.0053 | 0.0107 | x |
| 4.1 | 3.02% | 0.0058 | 0.0102 | x |
| 4.2 | 2.52% | 0.0060 | 0.0095 | x |
| 4.3 | 2.07% | 0.0060 | 0.0088 | x |
| 4.4 | 1.69% | 0.0059 | 0.0080 | x |
| 4.5 | 1.35% | 0.0057 | 0.0072 | x |
| 4.6 | 1.07% | 0.0054 | 0.0064 | ○ |
| 4.7 | 0.83% | 0.0051 | 0.0057 | ○ |
| 4.8 | 0.63% | 0.0048 | 0.0051 | ○ |
| 4.9 | 0.46% | 0.0045 | 0.0045 | ○ |
| 5.0 | 0.31% | 0.0042 | 0.0040 | ○ |

TABLE 5

| Applied voltage (V) | ΔY | Δx | Δy | Flicker |
|---|---|---|---|---|
| 3.0 | 0.07% | 0.0146 | 0.0100 | x |
| 3.1 | 1.76% | 0.0113 | 0.0055 | x |
| 3.2 | 2.67% | 0.0078 | 0.0012 | x |
| 3.3 | 2.95% | 0.0046 | 0.0022 | x |
| 3.4 | 2.83% | 0.0018 | 0.0046 | x |
| 3.5 | 2.49% | 0.0004 | 0.0061 | x |
| 3.6 | 2.06% | 0.0019 | 0.0068 | x |
| 3.7 | 1.61% | 0.0028 | 0.0069 | ○ |
| 3.8 | 1.19% | 0.0033 | 0.0065 | ○ |
| 3.9 | 0.83% | 0.0036 | 0.0060 | ○ |
| 4.0 | 0.52% | 0.0036 | 0.0053 | ○ |

TABLE 6

| Applied voltage (V) | ΔY | Δx | Δy | Flicker |
|---|---|---|---|---|
| 2.5 | 28.56% | 0.0156 | 0.0167 | x |
| 2.6 | 19.77% | 0.0166 | 0.0173 | x |
| 2.7 | 12.70% | 0.0163 | 0.0160 | x |
| 2.8 | 7.43% | 0.0147 | 0.0130 | x |
| 2.9 | 3.81% | 0.0122 | 0.0091 | x |
| 3.0 | 1.56% | 0.0091 | 0.0051 | x |
| 3.1 | 0.33% | 0.0060 | 0.0015 | ○ |
| 3.2 | 0.22% | 0.0033 | 0.0012 | ○ |
| 3.3 | 0.37% | 0.0012 | 0.0028 | ○ |
| 3.4 | 0.32% | 0.0002 | 0.0036 | ○ |
| 3.3 | 0.17% | 0.0011 | 0.0037 | ○ |

TABLE 7

| Applied voltage (V) | ΔY | Δx | Δy | Flicker |
|---|---|---|---|---|
| 4.0 | 2.01% | 0.0028 | 0.0008 | x |
| 4.1 | 1.91% | 0.0020 | 0.0014 | ○ |
| 4.2 | 1.80% | 0.0014 | 0.0018 | ○ |
| 4.3 | 1.68% | 0.0009 | 0.0022 | ○ |
| 4.4 | 1.56% | 0.0005 | 0.0024 | ○ |
| 4.5 | 1.44% | 0.0001 | 0.0025 | ○ |
| 4.6 | 1.33% | 0.0001 | 0.0026 | ○ |
| 4.7 | 1.23% | 0.0004 | 0.0027 | ○ |
| 4.8 | 1.14% | 0.0005 | 0.0027 | ○ |
| 4.9 | 1.05% | 0.0007 | 0.0026 | ○ |
| 5.0 | 0.97% | 0.0008 | 0.0026 | ○ |

TABLE 8

| Applied voltage (V) | ΔY | Δx | Δy | Flicker |
|---|---|---|---|---|
| 3.0 | 6.59% | 0.0116 | 0.0109 | x |
| 3.1 | 4.13% | 0.0104 | 0.0091 | x |
| 3.2 | 2.41% | 0.0089 | 0.0071 | x |
| 3.3 | 1.25% | 0.0074 | 0.0052 | x |
| 3.4 | 0.51% | 0.0059 | 0.0034 | ○ |
| 3.5 | 0.05% | 0.0046 | 0.0020 | ○ |
| 3.6 | 0.21% | 0.0034 | 0.0008 | ○ |
| 3.7 | 0.35% | 0.0025 | 0.0001 | ○ |
| 3.8 | 0.40% | 0.0017 | 0.0008 | ○ |
| 3.9 | 0.41% | 0.0011 | 0.0012 | ○ |
| 4.0 | 0.39% | 0.0006 | 0.0015 | ○ |

From the results shown in Table 7, it can be said that flicker is visually recognized when ΔY>2.0%. On the other hand, according to Tables 4, 5, 6 and 8, flicker is visually recognized in some cases even when ΔY<2.0%. This is presumed that, although the variation in luminance is not large, since the variation in chromaticity is large, the variation has been visually recognized as flicker. From the results shown in Tables 4, 5, 6 and 8, if either one of Δx and Δy exceeds 0.007, it can be said that flicker is visually recognized. In other words, if either one of ΔY>2.0%, Δx>0.007 and Δy>0.007 is satisfied, flicker is visually recognized.

Hence, conditions for suppressing flicker are ΔY 2.0%, Δx≤0.007 and Δy≤0.007. In other words, when the voltage applied across the liquid crystal layer during white display is switched between Vw⁺ and Vw⁻, if either one of ΔY>2.0%, Δx>0.007 and Δy>0.007 occurs, this occurrence is visually recognized as flicker. In the following description, the flicker occurring when ΔY>2.0% is referred to as luminance flicker, and the flicker occurring when Δx>0.007 or Δy>0.007 is referred to as color flicker.

However, there is an individual difference as to whether flicker is visually recognized or not. In order that flicker is not visually recognized securely, it is preferable that, for example, ΔY≤0.6%, Δx≤0.005 and Δy≤0.005 should be satisfied.

Next, in the configurations (see Table 9) wherein liquid crystal materials LC-1 to LC-6 were used and the thicknesses of the liquid crystal layer were 2.50 μm and 2.75 μm, the optimal ranges of 360°·d/p and θ3 were obtained by simulation. The LCD Master 3D (made by Shintech Inc.) was used for the simulation.

TABLE 9

Figure 14:
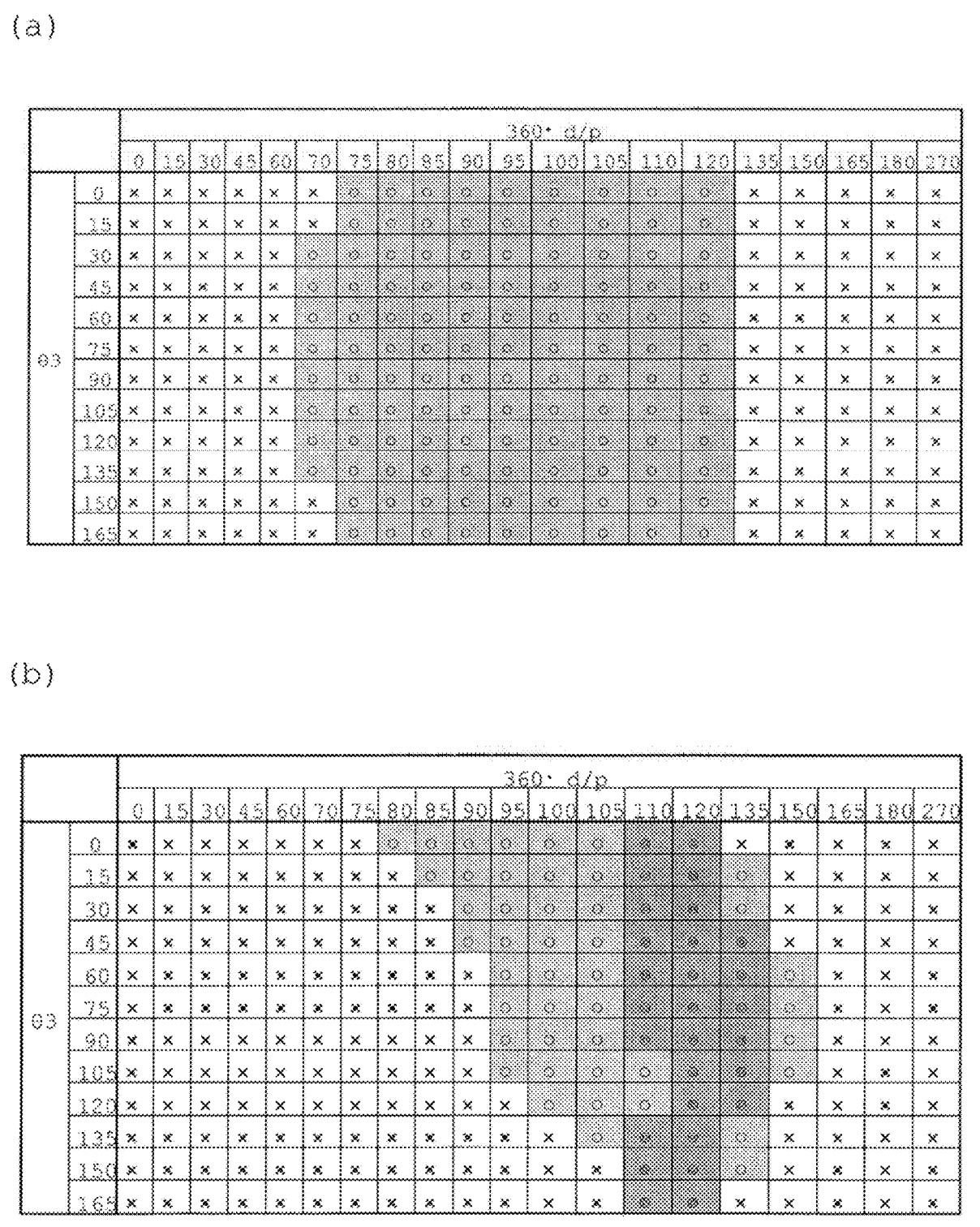
Figure 15:
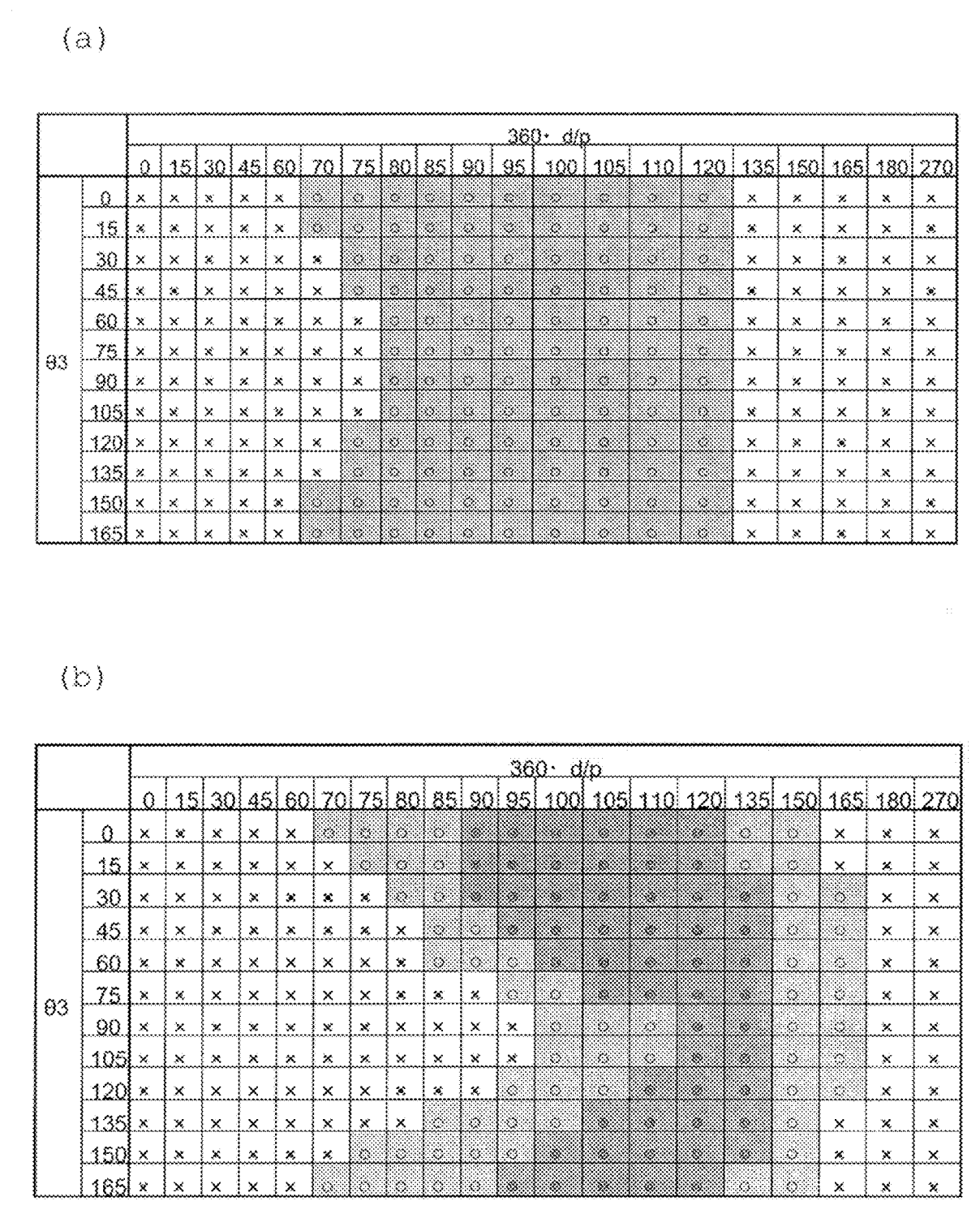
Figure 16:
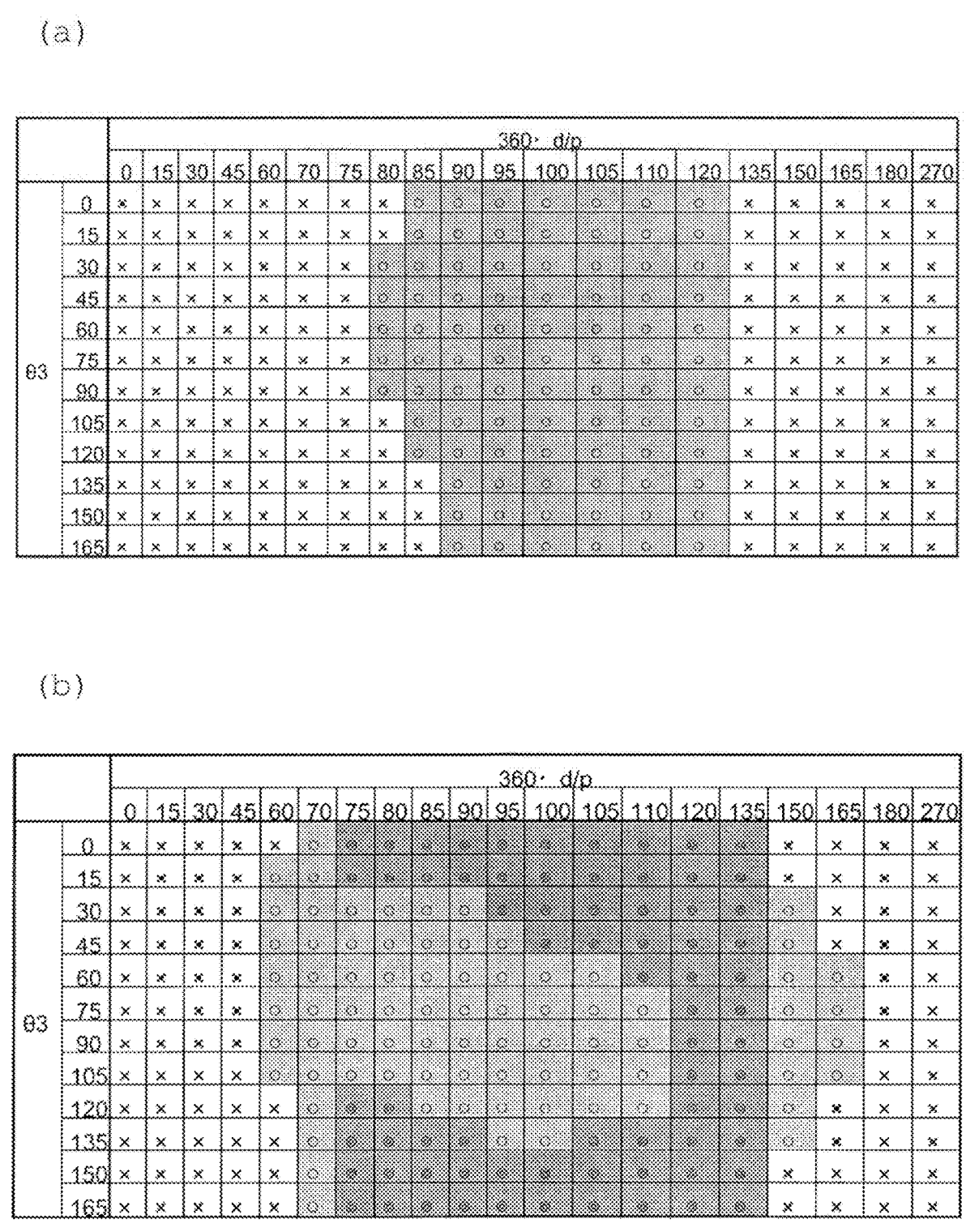
Figure 17:
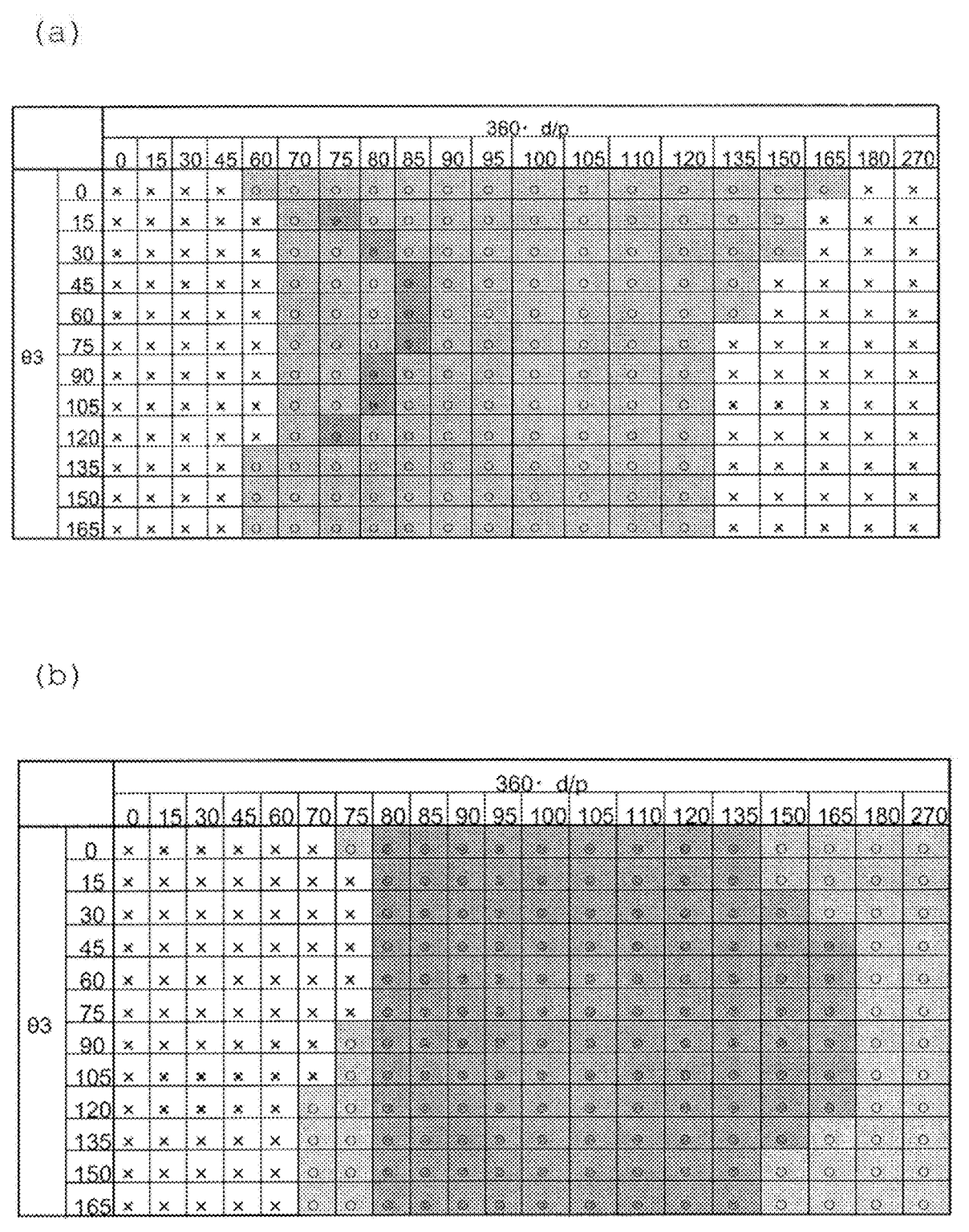
Figure 18:
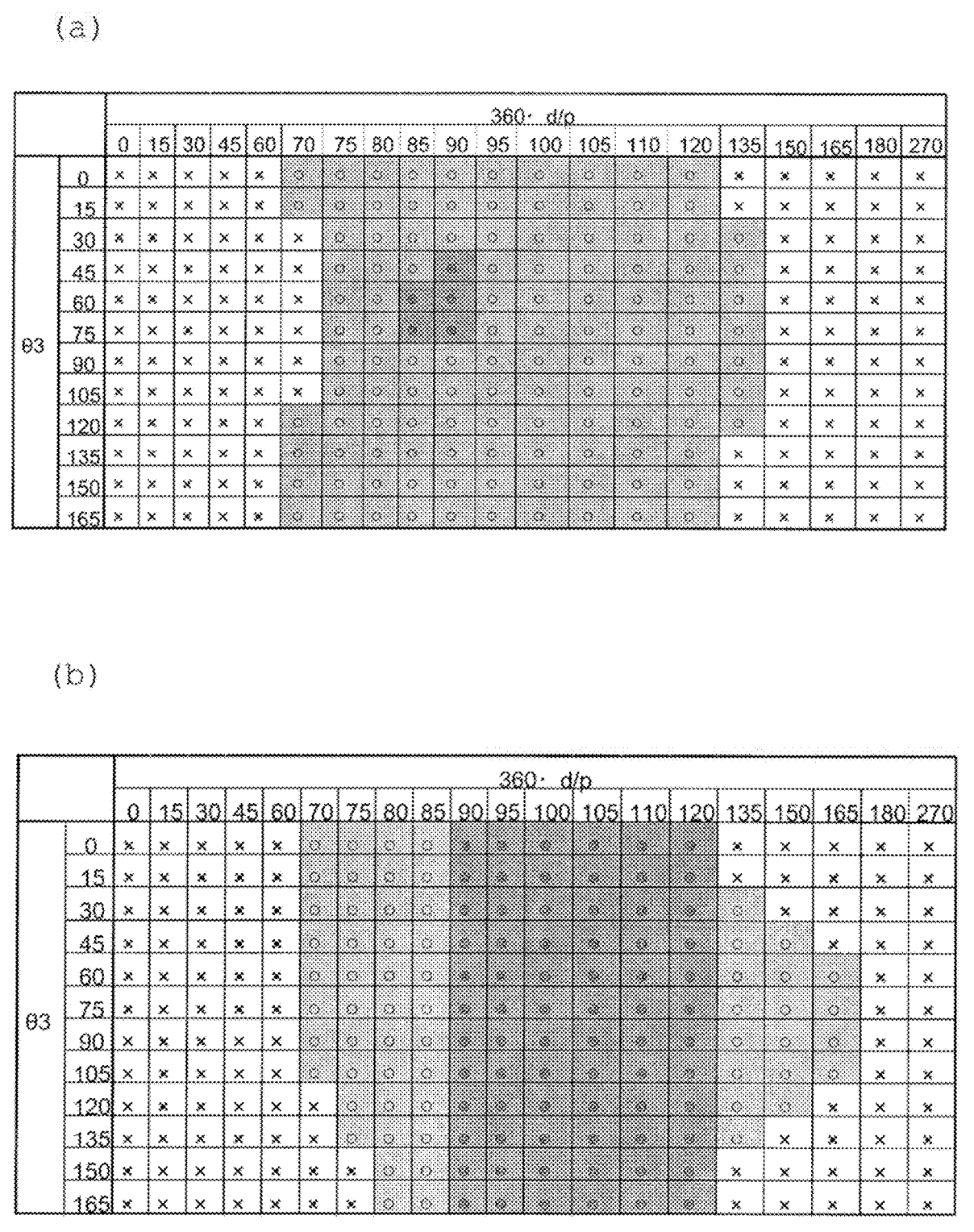
Figure 19:
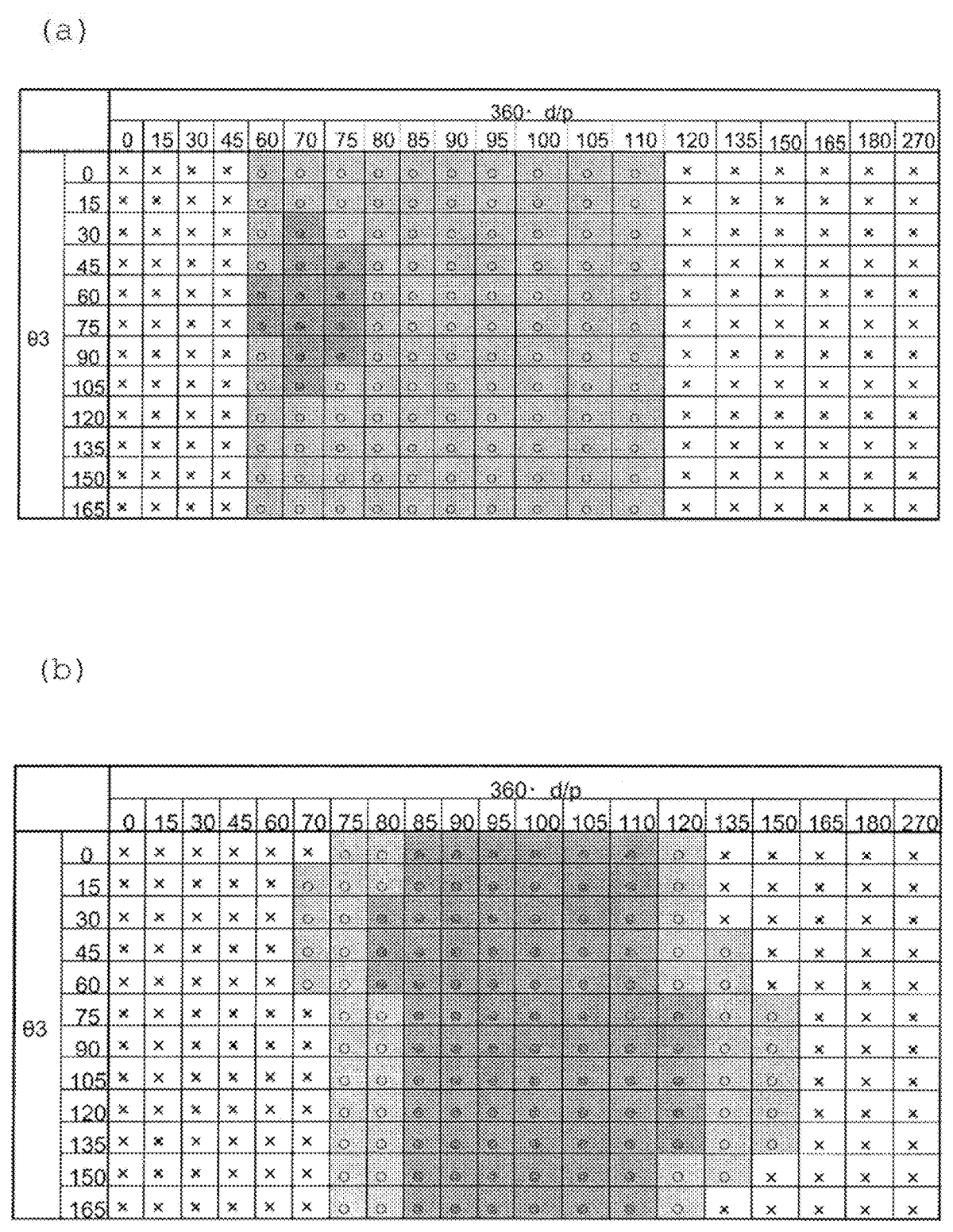

| | FIG. 14 | FIG. 15 | FIG. 16 | FIG. 17 | FIG. 18 | FIG. 19 |
|---|---|---|---|---|---|---|
| Liquid crystal | LC-1 | LC-1 | LC-2 | LC-2 | LC-3 | LC-3 |
| Δε | −8.0 | −8.0 | −7.1 | −7.1 | −6.8 | −6.8 |
| Δn | 0.1205 | 0.1205 | 0.1096 | 0.1096 | 0.1053 | 0.1053 |
| d (μm) | 2.75 | 2.50 | 2.75 | 2.50 | 2.75 | 2.50 |
| Δnd (nm) | 331 | 301 | 301 | 274 | 290 | 263 |

Figure 20:
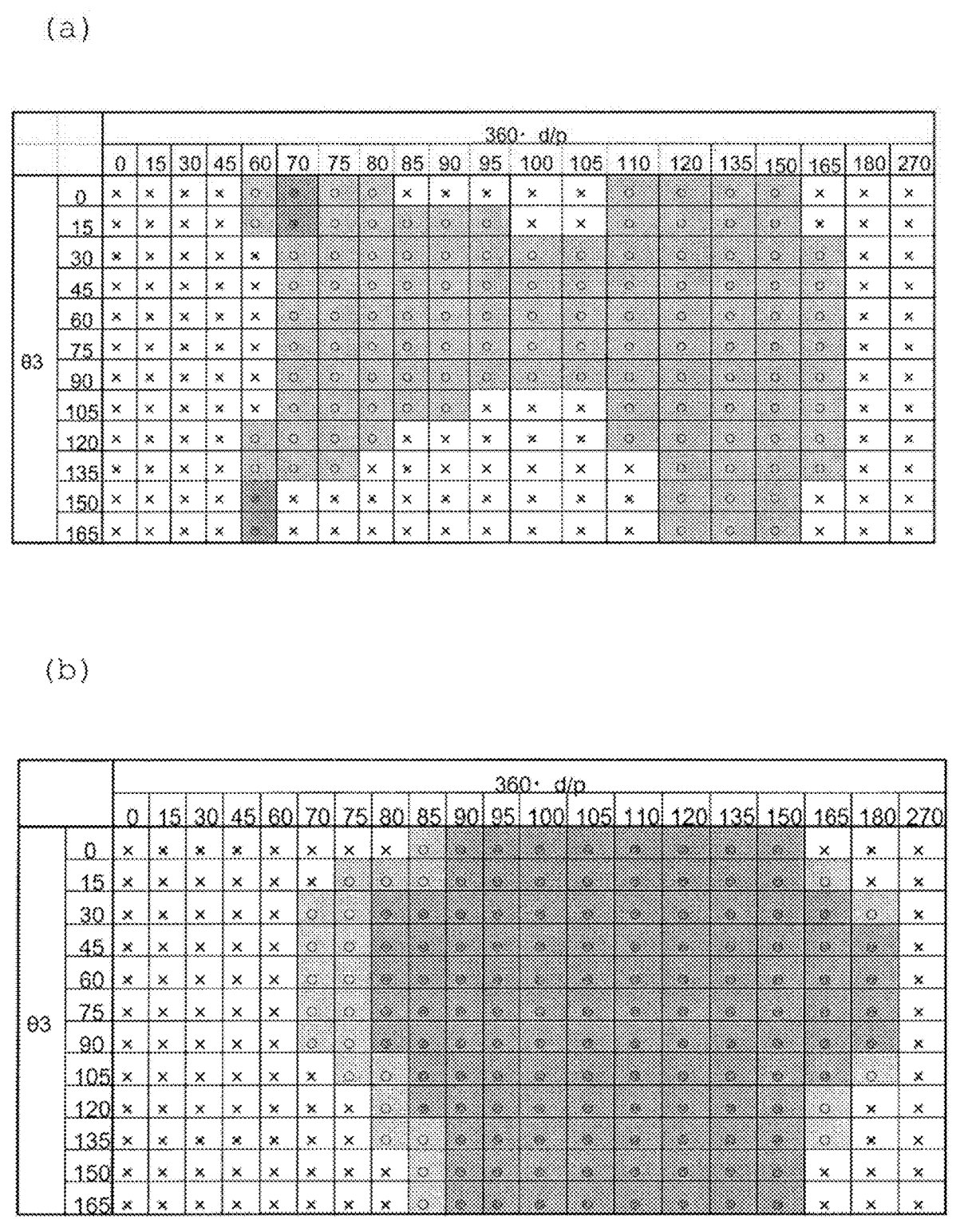
Figure 21:
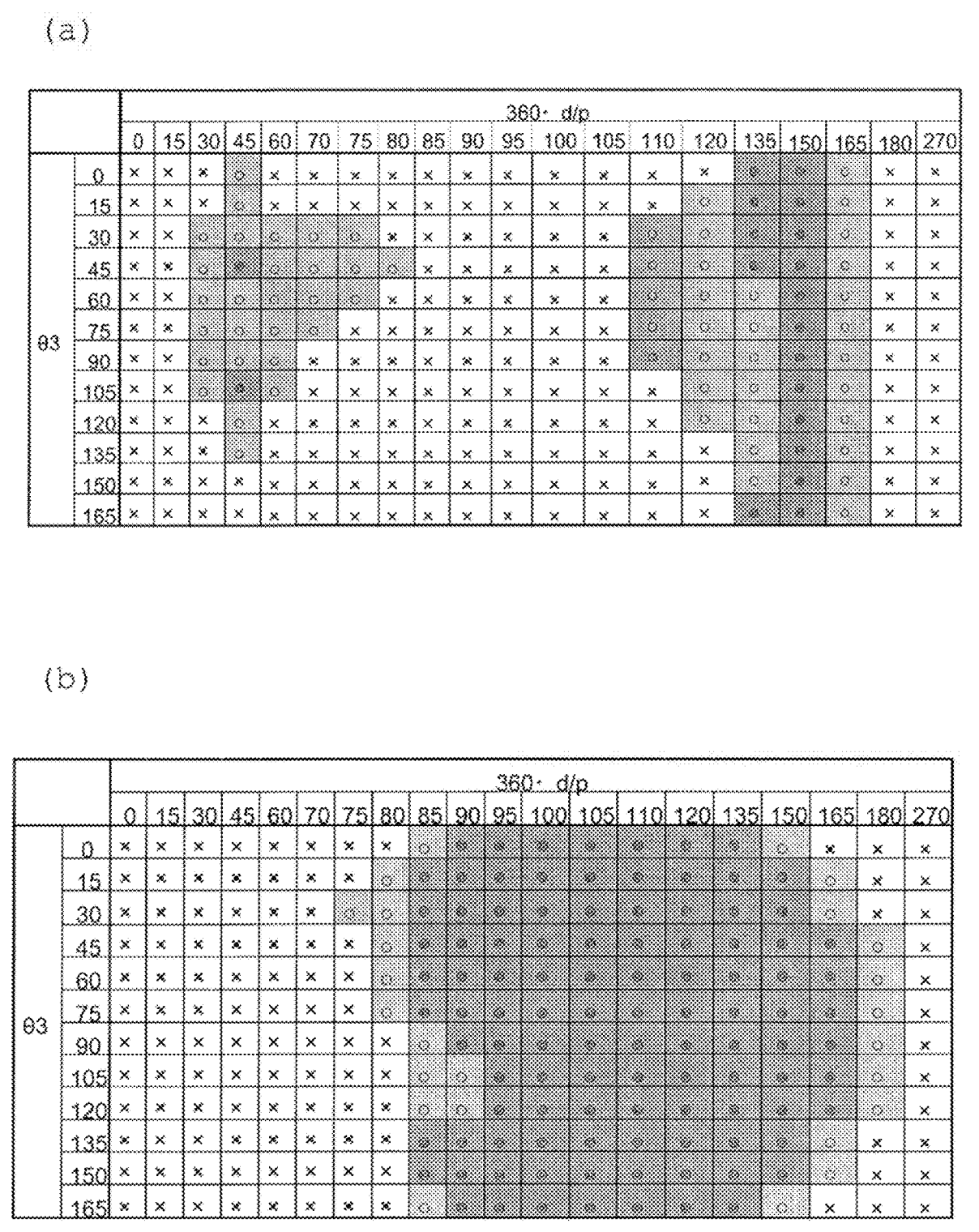
Figure 22:
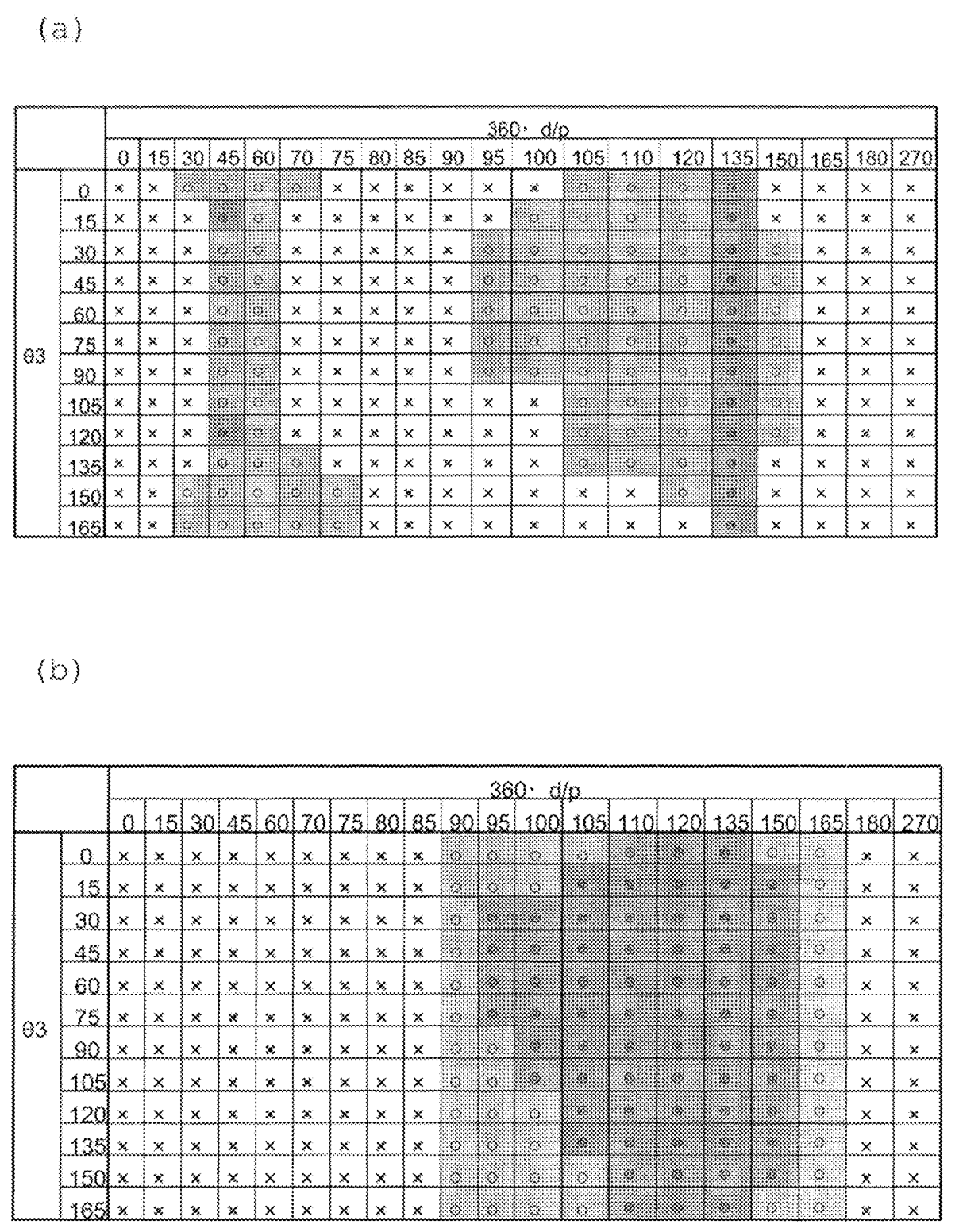
Figure 24:
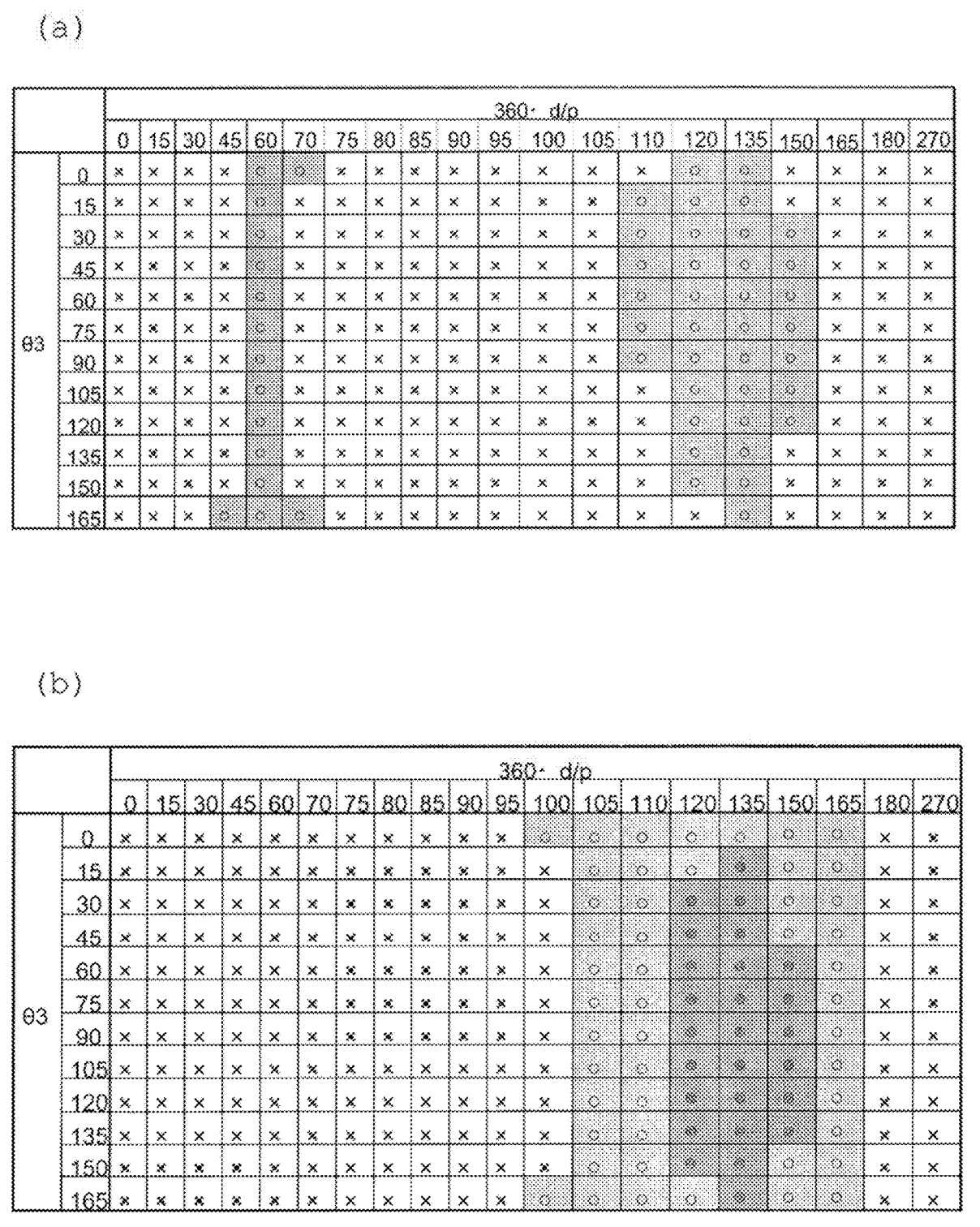
Figure 25:
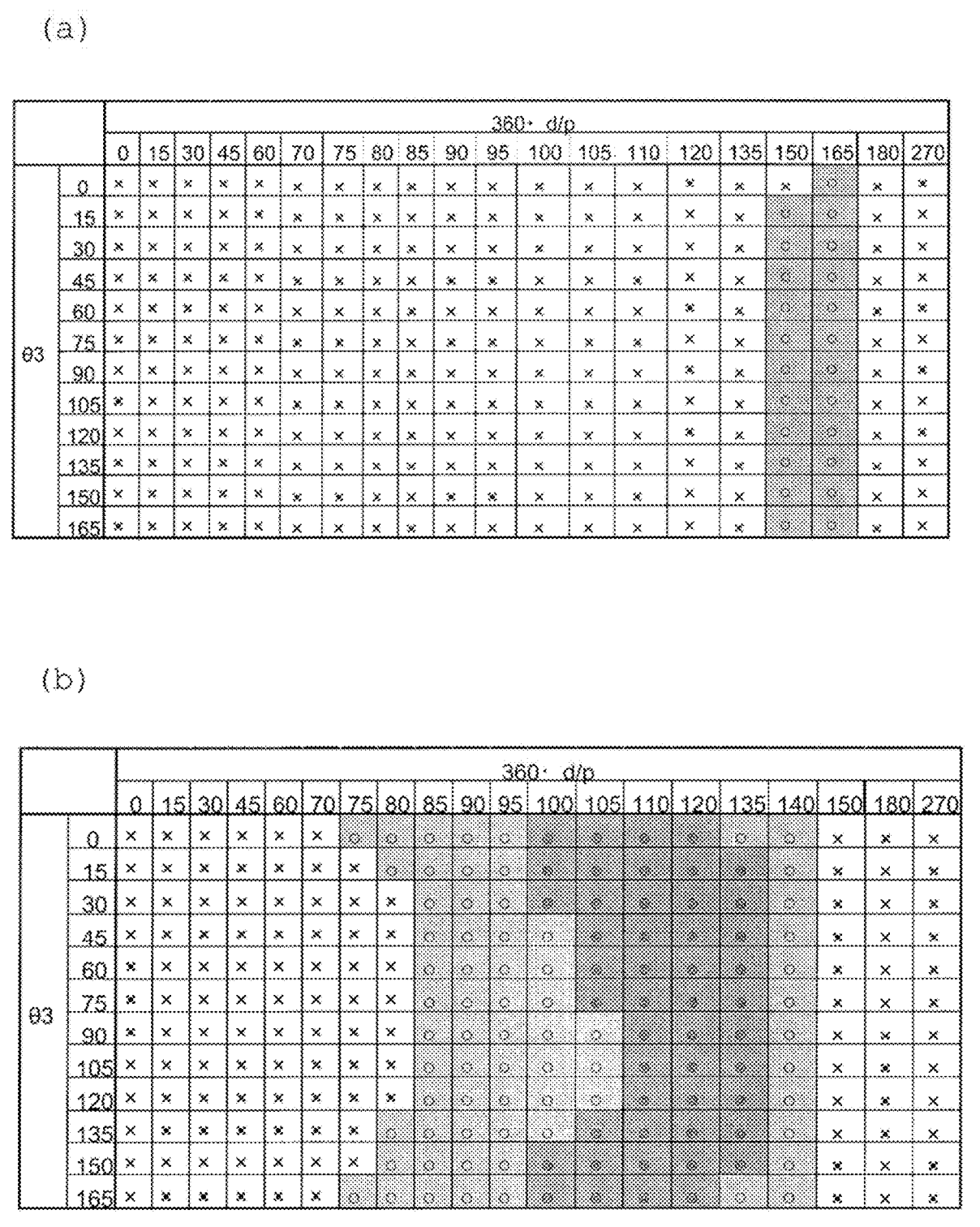

| | FIG. 20 | FIG. 21 | FIG. 22 | FIG. 23 | FIG. 24 | FIG. 25 |
|---|---|---|---|---|---|---|
| Liquid crystal | LC-4 | LC-4 | LC-5 | LC-5 | LC-6 | LC-6 |

TABLE 9-continued

| Δε | −6.5 | −6.5 | −6.2 | −6.2 | −5.8 | −5.8 |
|---|---|---|---|---|---|---|
| Δn | 0.0992 | 0.0992 | 0.0949 | 0.0949 | 0.0980 | 0.0980 |
| d (μm) | 2.75 | 2.50 | 2.75 | 2.50 | 2.75 | 2.50 |
| Δnd (nm) | 273 | 248 | 261 | 237 | 270 | 245 |

FIGS. 14 to 25 show the results of obtaining conditions satisfying $\Delta Y \leq 2.0\%$, $\Delta x \leq 0.007$ and $\Delta y \leq 0.007$ even if switching is performed between $Vw^+$ and $Vw^-$. The unit "°" representing an angle is omitted for the numerical values in these figures.

Each of FIGS. 14 to 25 is a figure showing the ranges of $\theta 3$ and $360° \cdot d/p$ in which the occurrence of flicker (luminance flicker (a) and color flicker (b)) in each sample of the reflective liquid crystal display devices having configurations shown in Table 9 is suppressed. In (a) of each figure, in the range of $0° \leq \theta 4 \leq 30°$, the ranges satisfying the condition $\Delta Y \leq 2.0\%$ are indicated by ○, and in (b), the ranges satisfying $\Delta x \leq 0.007$ and $\Delta y \leq 0.007$ are indicated by ○. Furthermore, in each figure, ⊚ indicates the cases in which, in the range of $0° \leq \theta 4 \leq 30°$, the conditions $\Delta Y \leq 0.6\%$, $\Delta x \leq 0.005$ and $\Delta y \leq 0.005$ are satisfied. Hence, in each figure, the range indicated by ⊚ or ○ in both (a) and (b) is the range in which no flicker is visually recognized.

As clearly shown in FIGS. 14 to 25, the range indicated by ⊚ or ○ in both (a) and (b) is narrow and within the ranges of $60° < |360° \cdot d/p| < 180°$ and $237 \text{ nm} \leq \Delta nd \leq 331 \text{ nm}$. Moreover, the range within the ranges of $75° < |360° \cdot d/p| < 165°$ and $237 \text{ nm} \leq \Delta nd \leq 290 \text{ nm}$ is further preferable because the ranges of $\theta 3$ and $360° \cdot d/p$ indicated by ⊚ with respect to at least either one of luminance flicker and color flicker are present.

The ranges satisfying "$\Delta Y$ 0.6%, $\Delta x \leq 0.005$ and $\Delta y \leq 0.005$" are described below.

In FIG. 17(a), the ranges including the three cells ($\theta 3$: 30°, 90° to 105°) indicated by ⊚ in the case that $360° \cdot d/p$ is 80° and the three cells ($\theta 3$: 45° to 75°) indicated by ⊚ in the case that $360° \cdot d/p$ is 85°

In FIG. 18(a), the ranges including the three cells ($\theta 3$: 45° to 75°) indicated by ⊚ in the case that $360° \cdot d/p$ is 90°

In FIG. 21(a), the ranges including the five cells ($\theta 3$: 0° to 45° and 165°) indicated by ⊚ in the case that $360° \cdot d/p$ is 135° and the ten cells ($\theta 3$: 15° to 150°) indicated by ⊚ in the case that $360° \cdot d/p$ is 150°

In FIG. 22(a), the ranges including the twelve cells ($\theta 3$: 0° to 165°) indicated by ⊚ in the case that $360° \cdot d/p$ is 135°

In FIG. 23(a), the ranges including the six cells ($\theta 3$: 0° to 45° and 150° to 165°) indicated by ⊚ in the case that $360° \cdot d/p$ is 150°

The liquid crystal material being low in Δε (large in absolute value) is suited for low-voltage driving. However, of the liquid crystal materials having been examined herein and satisfying $-8 \leq \Delta\varepsilon \leq -5.8$, only the materials satisfying $-7.1 \leq \Delta\varepsilon \leq -6.2$ were able to satisfy the conditions of $75° < |360° \cdot d/p| < 165°$ and $237 \text{ nm} \leq \Delta nd \leq 290 \text{ nm}$. Hence, it can be said that Δε of the liquid crystal material is preferably $-7.1 \leq \Delta\varepsilon \leq -6.2$.

Dependence on $\theta 3$ is small, and it is possible to find conditions that no flicker is observed even if $\theta 3$ has any angle in the range from 0° or more to less than 180°.

For example, all the experimental examples 1 to 7 described above satisfy the conditions of $60° < |360° \cdot d/p| < 180°$ and $237 \text{ nm} \leq \Delta nd \leq 331 \text{ nm}$. Furthermore, all the experimental examples 4 to 7 satisfy the conditions of $75° < |360° \cdot d/p| < 165°$ and $237 \text{ nm} \leq \Delta nd \leq 290 \text{ nm}$. Moreover, assuming that the utilization efficiency value in the case that only the polarizing plate was used was 100%, the utilization efficiency values of light in all the reflective liquid crystal display devices of experimental examples 1 to 7 in the white display state were 99% or more, and the contrast ratios were 20:1 or more. Various samples were trial manufactured, and reflective liquid crystal display devices having contrast ratios of 40:1 or more or 50:1 or more were obtained. The example in which only one of the vertical alignment films disposed on both the sides of the liquid crystal layer was subjected to alignment processing (VAHAN mode) was described herein; however, even if the vertical alignment films on both the sides are subjected to alignment processing (VATN mode), almost the same results are obtained, provided that the above conditions are satisfied.

With the embodiment of the present invention described above, it is possible to obtain a reflective liquid crystal display device capable of performing display at a contrast ratio of 20:1 or more, capable of suppressing the occurrence of flicker and excellent in low power consumption.

INDUSTRIAL APPLICABILITY

The present invention is widely applicable to reflective liquid crystal display devices and wearable devices equipped therewith.

REFERENCE SIGNS LIST

10: first substrate
11: sealing portion
13: gate bus line
14: first electrode (reflection pixel electrode)
15: data bus line
16: first vertical alignment film
20: second substrate
24: second electrode (counter electrode)
26: second vertical alignment film
30: pixel memory
30D: display voltage supply circuit
30M: memory circuit
42: polarizing layer
44: first retarder layer
46: second retarder layer
100: reflective liquid crystal display device

The invention claimed is:

1. A reflective liquid crystal display device comprising:
a first substrate having a first electrode that reflects light,
a second substrate having a second electrode that transmits light,
a liquid crystal layer provided between the first electrode and the second electrode, including a nematic liquid crystal material having negative dielectric anisotropy Δε and a chiral agent, having nearly vertical alignment when no voltage is applied, and having twist alignment or hybrid alignment when white voltage is applied, and
a polarizing layer provided on the observer side of the second substrate and at least one retarder layer disposed between the polarizing layer and the second substrate, wherein
the reflective liquid crystal display device has a drive circuit that applies black voltage or white voltage across the liquid crystal layer at a frame rate of 1 fps or less, and when applying white voltage across the liquid crystal layer over a plurality of frames, the drive circuit applies the white display voltage whose polarity is inverted for each frame with respect to the potential of the second electrode, and assuming that a natural pitch of the nematic liquid crystal material including the chiral agent is p, that a thickness of the liquid crystal layer is d, and that a birefringence of the nematic liquid crystal material is $\Delta n$, $60°<|360° \cdot d/p|<180°$ and $237\ nm \le \Delta nd \le 331\ nm$ are established.

2. The reflective liquid crystal display device of claim 1, wherein the thickness of the liquid crystal layer is 2.50 μm or more and 2.75 μm or less.

3. The reflective liquid crystal display device of claim 1, wherein a dielectric anisotropy $\Delta \varepsilon$ of the nematic liquid crystal material satisfies $-8 \le \Delta \varepsilon \le -5.8$.

4. The reflective liquid crystal display device of claim 1, wherein the absolute value of the white voltage is 3.0 V±0.2 V.

5. The reflective liquid crystal display device of claim 1, wherein the absolute value of the white voltage of positive polarity differs from that of the white voltage of negative polarity.

6. The reflective liquid crystal display device of claim 1, having a plurality of pixels, each of the plurality of pixels has the first electrode, the second electrode, and a 1-bit SRAM circuit.

7. The reflective liquid crystal display device of claim 1, wherein at least one of the first substrate and the second substrate has a vertical alignment film for pretilting the liquid crystal molecules of the liquid crystal layer in a predetermined direction when no voltage is applied across the liquid crystal layer.

8. The reflective liquid crystal display device of claim 1, wherein the first substrate has a first vertical alignment film, and the pretilted direction of the first vertical alignment film has an angle of 0° or more and less than 180° with respect to the transmission axis of the polarizing layer.

9. The reflective liquid crystal display device of claim 8, wherein the second substrate has a second vertical alignment film and the second vertical alignment film is not subjected to alignment processing.

10. The reflective liquid crystal display device of claim 1, wherein the at least one retarder layer includes first retarder layer and second retarder layer disposed between the polarizing layer and the first retarder layer, the in-plane retardation of the first retarder layer is 100 nm or more and 180 nm or less, and the in-plane retardation of the second retarder layer is 200 nm or more and 360 nm or less.

11. The reflective liquid crystal display device of claim 1, wherein assuming that the white voltage of positive polarity is $Vw^+$ and that the white voltage of negative polarity is $Vw^-$, assuming that, when the white voltage of positive polarity is applied, the luminous reflectance is $Y(Vw^+)$ and that the xy chromaticity values are $x(Vw^+)$ and $y(Vw^+)$, and assuming that, when the white voltage of negative polarity is applied, the luminous reflectance is $Y(Vw^-)$ and that the xy chromaticity values are $x(Vw^-)$ and $y(Vw^-)$, and further assuming that $\Delta Y=|\{Y(Vw^+)-Y(Vw^-)\}/(Y(Vw^-))|$, $\Delta x=|x(Vw^+)-x(Vw^-)|$ and $\Delta y=|y(Vw^+)-y(Vw^-)|$, $\Delta Y \le 2.0\%$, $\Delta x \le 0.007$ and $\Delta y \le 0.007$ are satisfied.

12. A wearable device equipped with the reflective liquid crystal display device of claim 1.

* * * * *